USO11067661B2

(12) United States Patent
Takahashi et al.

(10) Patent No.: US 11,067,661 B2
(45) Date of Patent: Jul. 20, 2021

(54) INFORMATION PROCESSING DEVICE AND INFORMATION PROCESSING METHOD

(71) Applicant: SONY CORPORATION, Tokyo (JP)

(72) Inventors: Naoya Takahashi, Tokyo (JP); Yuhki Mitsufuji, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 15/772,700

(22) PCT Filed: Sep. 28, 2016

(86) PCT No.: PCT/JP2016/078682
§ 371 (c)(1),
(2) Date: May 1, 2018

(87) PCT Pub. No.: WO2017/086030
PCT Pub. Date: May 26, 2017

(65) Prior Publication Data
US 2018/0332385 A1    Nov. 15, 2018

(30) Foreign Application Priority Data

Nov. 17, 2015    (JP) .............................. JP2015-224659

(51) Int. Cl.
*G01S 3/80* (2006.01)
*G01S 3/809* (2006.01)
(Continued)

(52) U.S. Cl.
CPC ............ *G01S 3/809* (2013.01); *G01S 3/8006* (2013.01); *G01S 3/8083* (2013.01); *G01S 3/80* (2013.01); *G01S 5/18* (2013.01)

(58) Field of Classification Search
CPC ...... G01S 3/809; G01S 3/8006; G01S 3/8083; G01S 3/80; G01S 5/18
See application file for complete search history.

(56) References Cited

U.S. PATENT DOCUMENTS 7,672,196 B1    3/2010   Hanyu
2005/0246167 A1*  11/2005  Nakajima ............. G01S 3/8083
                                                                 704/213
(Continued)

FOREIGN PATENT DOCUMENTS

EP         1813956 A1      8/2007
JP      2005-277832 A    10/2005
(Continued)

OTHER PUBLICATIONS

International Search Report and Written Opinion of PCT Application No. PCT/JP2016/078682, dated Dec. 27, 2016, 06 pages of English Translation and 05 pages of ISRWO.
(Continued)

*Primary Examiner* — Ian J Lobo
(74) *Attorney, Agent, or Firm* — Chip Law Group

(57) ABSTRACT

An information processing device including an acquisition unit that acquires a sound collection result of a sound from each of one or more sound sources obtained by a sound collection portion of which positional information indicating at least one of a position and a direction is changed and an estimation unit that estimates a direction of each of the one or more sound sources on a basis of a change in a frequency of a sound collected by the sound collection portion in association with a change in the positional information of the sound collection portion.

16 Claims, 13 Drawing Sheets

(51) Int. Cl.
   *G01S 3/808*   (2006.01)
   *G01S 5/18*   (2006.01)

(56) References Cited

U.S. PATENT DOCUMENTS

| | | | |
|---|---|---|---|
| 2011/0110531 A1* | 5/2011 | Klefenz | H04R 3/005 |
| | | | 381/92 |
| 2012/0093339 A1* | 4/2012 | Wu | G01S 3/8083 |
| | | | 381/92 |
| 2014/0282663 A1* | 9/2014 | Lee | H04N 21/44213 |
| | | | 725/18 |

FOREIGN PATENT DOCUMENTS

| | | |
|---|---|---|
| JP | 2011-061422 A | 3/2011 |
| JP | 2012-129873 A | 7/2012 |
| JP | 5004276 B2 | 8/2012 |
| WO | 2006/054599 A1 | 5/2006 |

OTHER PUBLICATIONS

International Preliminary Report on Patentability of PCT Application No. PCT/JP2016/078682, dated May 31, 2018, 07 pages of English Translation and 03 pages of IPRP.

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/078682 filed on Sep. 28, 2016, which claims priority benefit of Japanese Patent Application No. JP 2015-224659 filed in the Japan Patent Office on Nov. 17, 2015. Each of the above-referenced applications is hereby incorporated herein by reference in its entirety.

TECHNICAL FIELD

The present disclosure relates to an information processing device, an information processing method, and a program.

BACKGROUND ART

In recent years, with advances in so-called voice recognition technologies and sound analysis technologies, various information processing devices capable of recognizing states or situations using voice spoken by users or sounds from nearby sound sources as input information and executing processes in accordance with recognition results. Of the information processing devices, information processing devices that estimate arrival directions of sounds (that is, directions of sound sources) on the basis of collection results of voice or sounds and feed estimation results back to various processes such as suppression of noise and an improvement in recognition precision of target sounds have been proposed. For example, Patent Literature 1 discloses an example of a technology for estimating an arrival direction of a sound on the basis of a collection result of each of a plurality of microphones (hereinafter also referred to as a "sound collection portion").

CITATION LIST

Patent Literature

Patent Literature 1: JP 2011-61422A

DISCLOSURE OF INVENTION

Technical Problem

As an example of a structure for estimating an arrival direction of a sound, a technology in which a sound collection result of each of a plurality of sound collection portions is used, such as the technology disclosed in Patent Literature 1, can be exemplified. In the technology, a width of a main lobe of beamforming or a resolution related to estimation of an arrival direction of a sound depends on an interval or the number of sound collection portions, and many sound collection portions installed with high density are necessary to obtain a higher resolution at a broader frequency band in some cases.

On the other hand, an increase in the number of sound collection portions leads to an increase in various kinds of costs such as the cost of the sound collection portions, the cost of wirings, the cost of maintenance, and countermeasures for variation in characteristics between the sound collection portions in some cases. In addition, the weight of the device increases in association with the increase in the number of sound collection portions in some cases.

Accordingly, the present disclosure proposes an information processing device, an information processing method, and a program in which both a reduction in the number of sound collection portions and an improvement in a resolution in estimation of a direction of a sound source are compatible.

Solution to Problem

According to the present disclosure, there is provided an information processing device including: an acquisition unit configured to acquire a sound collection result of a sound from each of one or more sound sources obtained by a sound collection portion of which positional information indicating at least one of a position and a direction is changed; and an estimation unit configured to estimate a direction of each of the one or more sound sources on a basis of a change in a frequency of a sound collected by the sound collection portion in association with a change in the positional information of the sound collection portion.

In addition, according to the present disclosure, there is provided an information processing method including: acquiring a sound collection result of a sound from each of one or more sound sources obtained by a sound collection portion of which positional information indicating at least one of a position and a direction is changed; and estimating, by a processor, a direction of each of the one or more sound sources on a basis of a change in a frequency of a sound collected by the sound collection portion in association with a change in the positional information of the sound collection portion.

In addition, according to the present disclosure, there is provided a program causing a computer to execute: acquiring a sound collection result of a sound from each of one or more sound sources obtained by a sound collection portion of which positional information indicating at least one of a position and a direction is changed; and estimating a direction of each of the one or more sound sources on a basis of a change in a frequency of a sound collected by the sound collection portion in association with a change in the positional information of the sound collection portion.

Advantageous Effects of Invention

According to the present disclosure, as described above, there are provided an information processing device, an information processing method, and a program in which both a reduction in the number of sound collection portions and an improvement in a resolution in estimation of a direction of a sound source are compatible.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
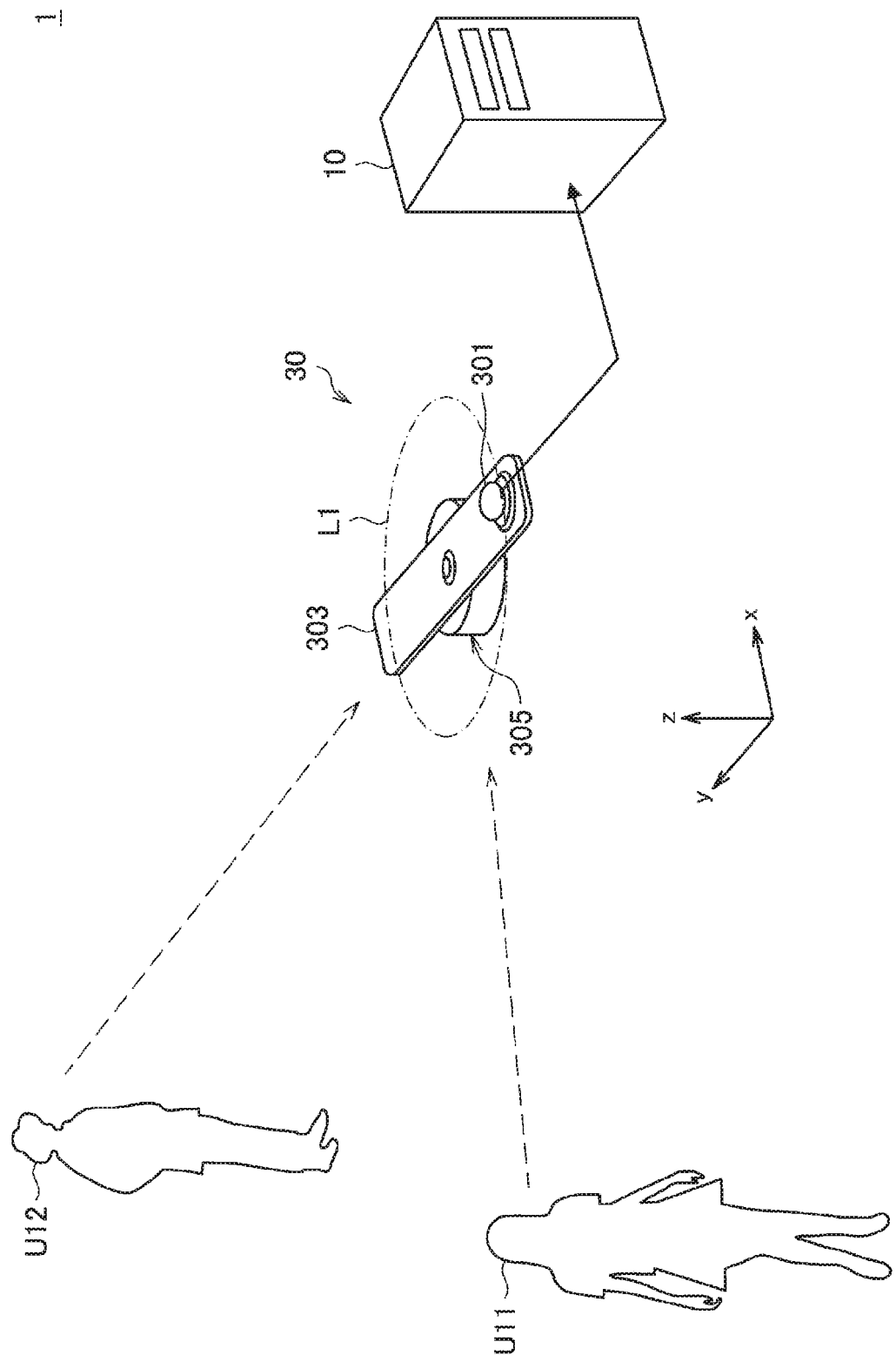
FIG. 1 is a diagram illustrating an example of a schematic system configuration of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, the description will be made in the following order.
1. Configuration
1.1. System configuration
1.2. Functional configuration
2. Technical features
2.1. Basic principle
2.2. Case in which sound collection portion moves circularly and sound arriving from sound source is regarded as plane wave
2.3. Case in which sound from sound source and path of sound collection portion are generalized
2.4. Case in which observation points are close to sound sources
2.5. Separation of sound sources and application to beamforming
3. Modification examples
3.1. Modification Example 1: Example of case in which plurality of sound collection portions are used
3.2. Modification Example 2: Combination with other direction estimation technologies
3.3. Modification Example 3: Example of case in which observation points are moved
3.4. Modification Example 4: Indoor application example
4. Hardware configuration
5. Conclusion

1. Configuration

1.1. System Configuration

First, an overview of an information processing system according to an embodiment of the present disclosure will be described. For example, FIG. 1 is a diagram illustrating an example of a schematic system configuration of the information processing system according to the embodiment. Also, in description of the example illustrated in FIG. 1, mutually orthogonal directions on a horizontal plane are referred to as x and y directions and a vertical direction is referred to as a z direction.

As illustrated in FIG. 1, an information processing system 1 according to the embodiment includes an information processing device 10 and a sound collection unit 30. In addition, the sound collection unit 30 includes a sound collection portion 301, a support portion 303, and a driving portion 305. The support portion 303 is partially connected to the driving portion 305 and is driven by the driving portion 305 to be rotated along a path L1 (circular path). In addition, the sound collection portion 301 is supported by the support portion 303. In this configuration, the driving portion 305 drives the support portion 303 so that the support portion 303 is rotated and the sound collection portion 301 is moved along the path L1 (that is, a position or a direction of the sound collection portion 301 is changed along the path L1).

The sound collection portion 301 includes a sound collection device such as a so-called microphone. In addition, the sound collection portion 301 may include, for example, a plurality of sound collection devices such as a microphone array. The sound collection portion 301 collects a sound arriving from the periphery and outputs a sound signal based on a sound collection result to the information processing device 10. For example, in the case of the example illustrated in FIG. 1, voice spoken by users U11 and U12 is collected by the sound collection portion 301 and a sound signal based on a sound collection result of the voice is output to the information processing device 10.

The information processing device 10 acquires a sound signal based on a sound collection result of voice or a sound (hereinafter generally referred to as a "sound" in some cases) from the sound collection portion 301 and estimates a direction of a sound source of the sound (that is, an arrival direction of the sound) with respect to the sound collection unit 30 on the basis of a change in the acquired sound signal. More specifically, the information processing device 10 estimates a direction of the sound source of the sound with respect to the sound collection unit 30 by using a characteristic in which a frequency of a sound signal based on a sound collection result of the sound is changed by the Doppler effect when the sound collection portion 301 is moved along a predetermined path (for example, a 2-dimensional or 3-dimensional path).

As a specific example, in the example illustrated in FIG. 1, the sound collection portion 301 is moved on a horizontal plane (that is, the xy plane) along the 2-dimensional path L1 (that is, a circular path). At this time, from the viewpoint of a positional relation between the sound collection portion 301 and the user U11, when the sound collection portion 301 is moved along the path L1, a relative positional relation between the user U11 and the sound collection portion 301 is changed and a distance between the sound collection portion 301 and the user U11 is changed. Thus, for example, a frequency of a sound signal based on a sound collection result of a sound spoken by the user U11 in the sound collection portion 301 is changed by the Doppler effect. At this time, for example, the information processing device 10 directly or indirectly recognizes a change in the position of the sound collection portion 3301 and estimates a direction of a sound source (that is, the user U11) with respect to the sound collection unit 30 on the basis of the change in the position of the sound collection portion 301 and a change in the sound signal based on the sound collection result by the sound collection portion 301. The same also applies to the case of the user U12.

In addition, the information processing device 10 may control an operation of the sound collection unit 30. Specifically, the information processing device 10 may move the sound collection portion 301 along a predetermined path (for example, the path L1) at a desired velocity by controlling an operation of the driving portion 305. Thus, the information processing device 10 can recognize a change in the position or the direction of the sound collection portion 301 in association with the driving of the driving portion 305.

In addition, a control entity of the sound collection unit 30 may not necessarily be the information processing device 10. In this case, for example, the information processing device 10 may recognize a change in the position or the direction of the sound collection portion 301 in association with the driving of the driving portion 305 by acquiring information indicating a driving state of the driving portion 305 from the sound collection unit 30. Also, in the following description, the information processing device 10 is assumed to control an operation of the sound collection unit 30 (in particular, the driving portion 305).

The overview of the information processing system according to the embodiment has been described above with reference to FIG. 1.

1.2. Functional Configuration

Figure 2:
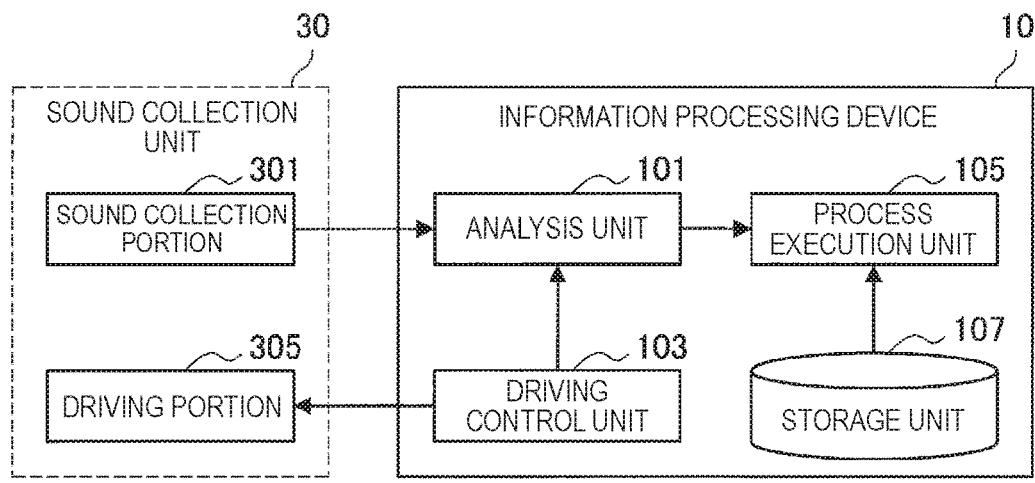
FIG. 2 is a block diagram illustrating an example of a functional configuration of the information processing system according to the embodiment.

Next, an example of a functional configuration of the information processing system 1 according to the embodiment will be described with reference to FIG. 2 particularly focusing on a functional configuration of the information processing device 10. FIG. 2 is a block diagram illustrating an example of a functional configuration of the information processing system 1 according to the embodiment.

As illustrated in FIG. 2, the information processing device 10 includes an analysis unit 101, a driving control unit 103, a process execution unit 105, and a storage unit 107.

The driving control unit 103 controls an operation of the driving portion 305. In addition, the driving control unit 103 outputs information indicating a control result of the driving portion 305 to the analysis unit 101 to be described below. Thus, the analysis unit 101 can recognize the control result of the driving portion 305 and can further recognize a motion (that is, a change in a position or a direction) of the sound collection portion 301 in association with the driving of the driving portion 305.

The analysis unit 101 acquires a sound signal based on a sound collection result of a sound from the sound collection portion 301. In addition, the analysis unit 101 acquires information indicating a control result of the driving portion 305 from the driving control unit 103. The analysis unit 101 recognizes a motion (that is, changes in the position and the direction) of the sound collection portion 301, such as a movement direction, a change in the direction, and a movement velocity of the sound collection portion 301 on the basis of the information indicating a control result of the driving portion 305. Then, the analysis unit 101 estimates a direction of a sound source (that is, an arrival direction of a sound) with respect to the sound collection unit 30 on the basis of the recognized motion of the sound collection portion 301 and a change in the sound signal (that is, a change in a frequency by the Doppler effect) acquired from the sound collection portion 301. Then, the analysis unit 101 outputs information indicating an estimation result of the direction of the sound source to the process execution unit 105 to be described below. Also, the details of a process related to the estimation of the direction of the sound source by the analysis unit 101 will be described separately as "3. Technical features." In addition, the analysis unit 101 is equivalent to an example of an "estimation unit."

The storage unit 107 is a region in which various kinds of data used for the information processing device 10 to execute various functions are stored temporarily or permanently. For example, the storage unit 107 stores data (for example, a library) used for the process execution unit 105 to be described below to execute various functions (for example, applications) or information (for example, setting information) used to execute the functions.

The process execution unit 105 has a configuration in which various functions (for example, applications) provided by the information processing device 10 are executed. The process execution unit 105 may acquire information indicating an estimation result of the direction of the sound source from the analysis unit 101 and execute various functions on the basis of the estimation result of the direction of the sound source.

As a specific example, the process execution unit 105 may emphasize a sound arriving from the direction of the sound source (that is, a sound from the sound source) on the basis of the estimation result of the direction of the sound source. In addition, as another example, the process execution unit 105 may suppress a sound arriving from different directions (that is, noise) on the basis of the estimation result of the direction of the sound source. In this case, for example, the process execution unit 105 may emphasize or suppress a sound arriving from a desired direction by multiplying the acquired sound signal by a gain value in accordance with the direction. Also, the process execution unit 105 is equivalent to an example of a "sound control unit."

In addition, the process execution unit 105 may control an operation of another configuration on the basis of the estimation result of the direction of the sound source. As a specific example, the process execution unit 105 may control directivity of a device (a so-called directivity device) such as a speaker or a microphone capable of controlling the directivity on the basis of the estimation result of the direction of the sound source. As a more specific example, in a case in which voice of a user is collected, the process execution unit 105 may control the directivity such that the directivity of the directivity speaker is oriented in a direction of the user on the basis of the estimation result of the direction of the sound source (that is, the user).

Also, the functional configuration of the information processing system 1 described with reference to FIG. 2 is merely an example and this configuration is not necessarily limiting. As a specific example, the sound collection unit 30 and the information processing device 10 may be integrated. In addition, some of the configurations of the information processing device 10 may be installed in a different external device (for example, a server) from the information processing device 10. In addition, another configuration different from the various configurations illustrated in FIG. 2 may be installed in accordance with a function provided by the information processing device 10. As a specific example, a directivity device (for example, a speaker or a microphone) which is not a control target of the process execution unit 105 may be installed separately.

The example of the functional configuration of the information processing system 1 according to the embodiment has been described with reference to FIG. 2 particularly focusing on the functional configuration of the information processing device 10.

2. Technical Features

Next, the details of a process related particularly to the estimation of the direction of the sound source by the information processing device 10 (in particular, the analysis unit 101) will be described as technical features of the embodiment.

2.1. Basic Principle

As described above, the information processing system 1 according to the embodiment estimates a direction of a sound source (an arrival direction of a sound) by using a characteristic in which a sound signal based on a sound collection result of the sound is changed by the Doppler effect when a position or a direction of the sound collection portion is changed along a predetermined path (for example, a 2-dimensional or 3-dimensional path). In the estimation of the direction of the sound source, the information processing system 1 according to the embodiment assumes the following:

(1) a movement velocity of the sound collection portion is known or observable;

(2) a sound arriving from a sound source which is a direction estimation target includes a section in which constancy and a tone property can be assumed;

(3) a movement velocity of the sound source when viewed from the sound collection portion is at least sufficiently smaller than a velocity at which the sound collection portion is moved along a predetermined path; and (4) a velocity change of the sound source when viewed from the sound collection portion is at least sufficiently gentler than a velocity at which the sound collection portion is moved along the predetermined path.

The assumption (1) can be realized, for example, when the information processing device 10 executes control such that the sound collection portion 301 is moved along a path decided in advance. In addition, as another example, the assumption (1) can also be realized when the information processing device 10 calculates a movement velocity of the sound collection portion 301 on the basis of detection results of various sensors or the like.

The assumption (2) means that a sound in which a property of a sound is not sharply changed over time (steady property) at least in an observation section of a spectrogram and which has a so-called long wave structure (tone property) is a target. Also, the assumption (2) can be broadly applied to, for example, a sound that has a tone property, such as voice, a piece of music, a cry of an animal, or a siren.

The extent of the assumptions (3) and (4) is changed in accordance with a movement velocity of the sound collection portion 301. However, the assumptions (3) and (4) can be applied to a case in which a sound source is sufficiently farther from the sound collection portion 301 (in other words, a case in which a sound arriving from a sound source is regarded as a plane wave). In addition, even in a case in which the position of the sound source is close to the sound collection portion 301, the assumptions (3) and (4) can be applied to a case in which a latitude velocity of the sound source is sufficiently slower than a movement velocity of the sound collection portion 301 (also including the case in which it is stopped).

In addition, as described above, the information processing device 10 according to the embodiment uses the Doppler effect generated by moving the sound collection portion 301 for estimation of a direction of a sound source. Specifically, in a case in which the sound collection portion 301 moves closer to the sound source, a pitch of a sound collection result of a sound from the sound source is observed to be higher than the sound (that is, a wavelength becomes shorter). Conversely, in a case in which the sound collection portion 301 moves farther from the sound source, a pitch of a sound collection result of a sound from the sound source is observed to be lower than the sound (that is, a wavelength becomes longer).

In the above-described assumption (2), in a section in which a sound arriving from a sound source is regarded as being steady, a change in a pitch in the section depends more on a change in a movement velocity of the sound collection portion 301 and an arrival direction of the sound than in the assumptions (3) and (4). Also, in the assumption (1), since a change in the movement velocity of the sound collection portion 301 is known, the information processing device 10 can estimate an arrival direction of the sound (that is, the direction of the sound source) on the basis of a change in the pitch of the sound signal based on a sound collection result of the sound. Also, a specific example will be described in more detail below.

2.2. Case in which Sound Collection Portion Moves Circularly and Sound Arriving from Sound Source is Regarded as Plane Wave First, an example of a method of estimating a direction of a sound source will be described with reference to FIGS. 3 and 4 focusing on a case in which the sound source is sufficiently farther from the sound collection portion 301, a sound arriving from the sound source is regarded as a plane wave, and the sound collection portion 301 moves along a circular path at an equal velocity.

Figure 3:
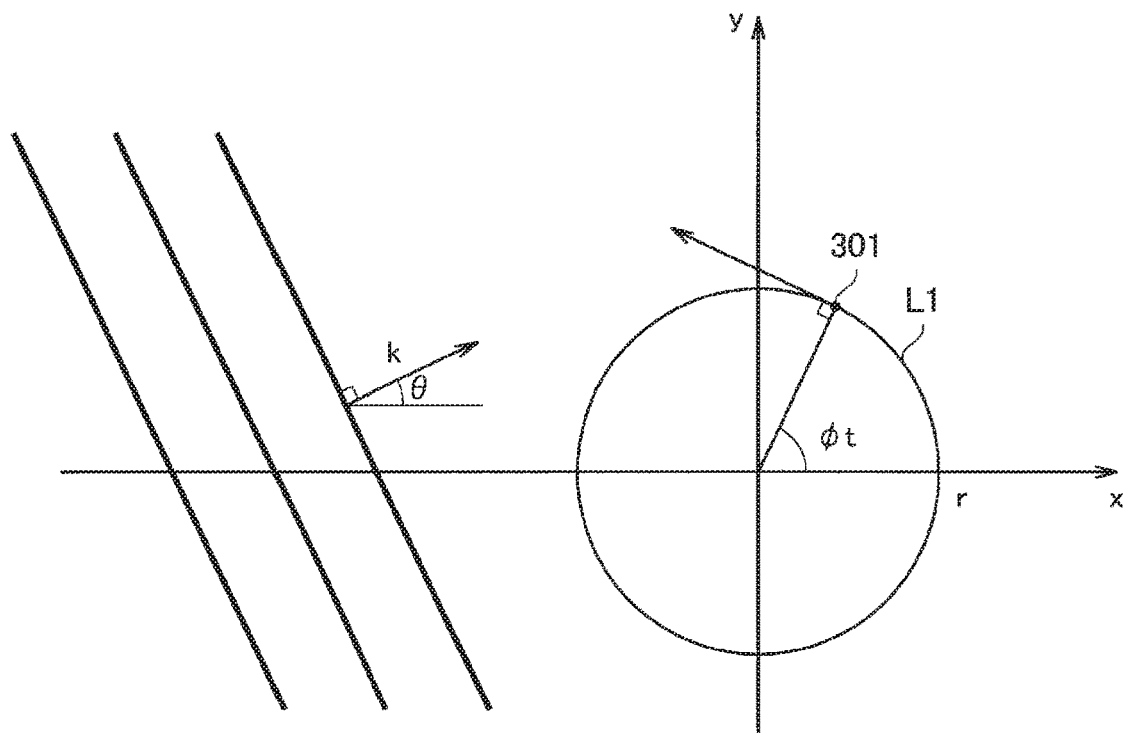
FIG. 3 is a diagram schematically illustrating an example of a spatially positional relation between a sound collection portion and a sound in a case in which the sound collection portion moves circularly.

For example, FIG. 3 is a diagram schematically illustrating an example of a spatially positional relation between the sound collection portion 301 and a sound in a case in which the sound collection portion 301 moves circularly. Also, in the description, as illustrated in FIG. 3, an example of a method of estimating a direction of sound source by moving the sound collection portion 301 on a circle of a radius r at a predetermined angular velocity φ will be described. Also, the plane wave is a sine wave of which a travel direction is θ and a frequency is $f_0$. Here, when $v=(v_x, v_y)$ is a velocity at time t of the sound collection portion 301, the velocity v is expressed in a calculation equation indicated as the following (Equation 1).

[Math. 1]

$$v = r\phi(-\sin(\phi t + \phi_0), \cos(\phi t + \phi_0)) \quad \text{(Equation 1)}$$

Also, the foregoing (Equation 1), $\phi_0$ is assumed to indicate an angle at t=0. Here, when $e_k=(\cos \theta, \sin \theta)$ is a unit vector oriented in a travel direction of the plane wave, the unit vector is modulated by the Doppler effect and a frequency f of a signal observed in the sound collection portion 301 (hereinafter also referred to as an "observed signal") is expressed in a calculation equation indicated as the following (Equation 2). Also, as expressed in (Equation 2), vi is expressed by an inner product of $e_k$ and v.

[Math. 2]

$$f = \frac{c - v_\perp}{c} f_0 = \left(1 + \frac{r\phi}{c} \sin(\phi t + \phi_0 + \theta)\right) f_0 \quad \text{(Equation 2)}$$
$$v_\perp = e_k \cdot v$$

In the foregoing (Equation 2), the frequency $f_0$ of the plane wave is an unknown value. However, since other values are known, it is possible to derive the direction of the sound source (that is, the arrival direction of the plane wave) from a modulation phase of the frequency f of the observed signal.

Figure 4:
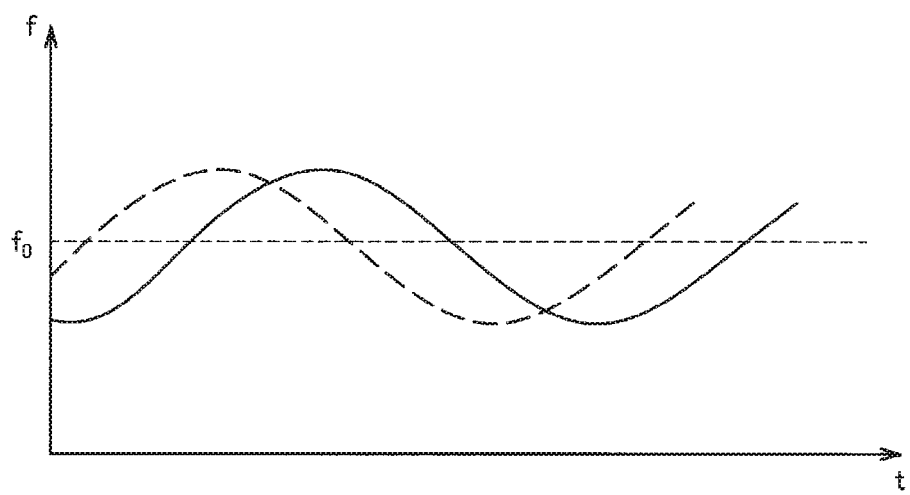
FIG. 4 is a diagram illustrating an example of an observation result of a sound arriving from each of a plurality of sound sources located at mutually different positions.

Also, in a case in which there are a plurality of sound sources, a sound arriving from each of the sound sources is modulated with a phase corresponding to the position of the sound source. For example, FIG. 4 is a diagram illustrating an example of an observation result of a sound arriving from each of a plurality of sound sources located at mutually different positions. In FIG. 4, the horizontal axis represents time t and the vertical axis represents the frequency f of the observed signal. Also, a plurality of graphs illustrated in FIG. 4 indicate examples of observed signals based on sounds arriving from different sound sources, respectively. Referring to FIG. 4, it can be understood that a direction of each of the plurality of sound sources can be estimated by the single sound collection portion 301 in the information processing system 1 according to the embodiment. In addition, in the information processing system 1 according to the embodiment, by extracting only signals with specific phases, for example, it is possible to extract and separate a sound arriving from a sound source located in a desired direction even under a situation in which frequencies of the signals are superimposed.

The example of the method of estimating the direction of the sound source has been described above with reference to FIGS. 3 and 4 focusing on the case in which the sound source is sufficiently farther from the sound collection portion 301, the sound arriving from the sound source is regarded as the plane wave, and the sound collection portion 301 moves along a circular path at an equal velocity.

2.3. Case in which Sound from Sound Source and Path of Sound Collection Portion are Generalized Next, an example of a method of estimating a direction of a sound source in a case in which the sound of the sound source and a path of the sound collection portion are generalized, that is, a case in which the sound arriving from the sound source is not limited to a sine wave and the path along which the sound collection portion 301 is moved is not limited to the circular path will be described with reference to FIGS. 5 and 6. Also, in the description, it is also assumed that the sound source is sufficiently farther from the sound collection portion 301, and thus a sound arriving from the sound source is regarded as a plane wave.

First, it is assumed that A(ω, t) is a spectrum of a sound arriving from the sound source at time t, $v=(v_x, v_y)$ is a velocity of the sound collection portion 301 at time t, $e_k=(\cos \theta, \sin \theta)$ is a unit vector oriented in a travel direction of the plane wave, and), vi is a component in a traveling direction of the plane wave with a velocity v. Also, vi is expressed by an inner product of $e_k$ and v as in the above-described example. In addition, an angular frequency is expressed with w. At this time, a spectrum Ã(ω, t) of the signal observed by the sound collection portion 301 (that is, the observed signal) is expressed in a calculation equation indicated as the following (Equation 3). Also, "Ã" is assumed to indicate a letter with tilde on "A."

[Math. 3]

$$\tilde{A}(\omega, t) = A\left(\frac{c}{c + v_\perp}\omega, t - \frac{d}{c}\right) = A\left(\omega_0, t - \frac{d}{c}\right) \quad \text{(Equation 3)}$$
$$\therefore \omega = \frac{c + v_\perp}{c}\omega_0$$

Also, in the foregoing (Equation 3), d indicates a distance from the sound source to the sound collection portion 301. In addition, $\omega_0$ indicates an angular frequency of a sound arriving from the sound source. In addition, w indicates an angular frequency modulated (instantaneously) by the Doppler effect. Here, a relation equation indicated as the following (Equation 4) is established since a spectrum can be regarded as being steady in a certain short section by the above-described assumption (2).

[Math. 4]

$$\frac{dA}{dt} = 0 \quad \text{(Equation 4)}$$

When the spectrum Ã(ω, t) of the observed signal described above as (Equation 3) is partially differentiated with respect to time t on the basis of the relation equation indicated as the foregoing (Equation 4), a calculation equation indicated as (Equation 5) is derived.

[Math. 5]

$$\frac{\partial \tilde{A}}{\partial t} = \frac{\partial}{\partial t} A\left(\frac{c}{c+v_\perp}\omega, t - \frac{d}{c}\right) = \quad \text{(Equation 5)}$$

$$\frac{\partial A}{\partial \omega_0}\frac{\partial \omega_0}{\partial t} + \frac{dA}{dt} = \frac{\partial A}{\partial \omega_0}\frac{\partial \omega_0}{\partial t} = \frac{\partial A}{\partial \omega_0}\frac{-\frac{dv_\perp}{dt}c\omega}{(c+v_\perp)^2}$$

On the other hand, partial differentiation in a frequency direction of the spectrum A~(ω, t) of the observed signal is expressed in a calculation equation indicated as the following (Equation 6).

[Math. 6]

$$\frac{\partial \tilde{A}}{\partial \omega} = \frac{\partial A}{\partial \omega_0}\frac{c}{c+v_\perp} \quad \text{(Equation 6)}$$

Here, when γ is a ratio of partial differentiation in a time direction of the spectrum A~(ω, t) of the observed signal to the partial differentiation in the frequency direction of the spectrum A~(ω, t), γ is expressed in a calculation equation indicated as the following (Equation 7).

[Math. 7]

$$\gamma = \frac{\frac{\partial \tilde{A}}{\partial t}}{\frac{\partial \tilde{A}}{\partial \omega}} = \frac{-\frac{dv_\perp}{dt}\omega}{c+v_\perp} = \frac{-\omega e_k \cdot \frac{dv}{dt}}{c+e_k \cdot v} \quad \text{(Equation 7)}$$

Here, since γ and v can be observed, the arrival direction $e_k$ of the sound (that is, the direction of the sound source) can be estimated on the basis of the foregoing (Equation 7). Also, since an influence of an observation error or noise is also assumed substantially, γ may be obtained in a plurality of (ω, t) and estimation precision of the arrival direction $e_k$ of the sound may be improved.

Figure 5:
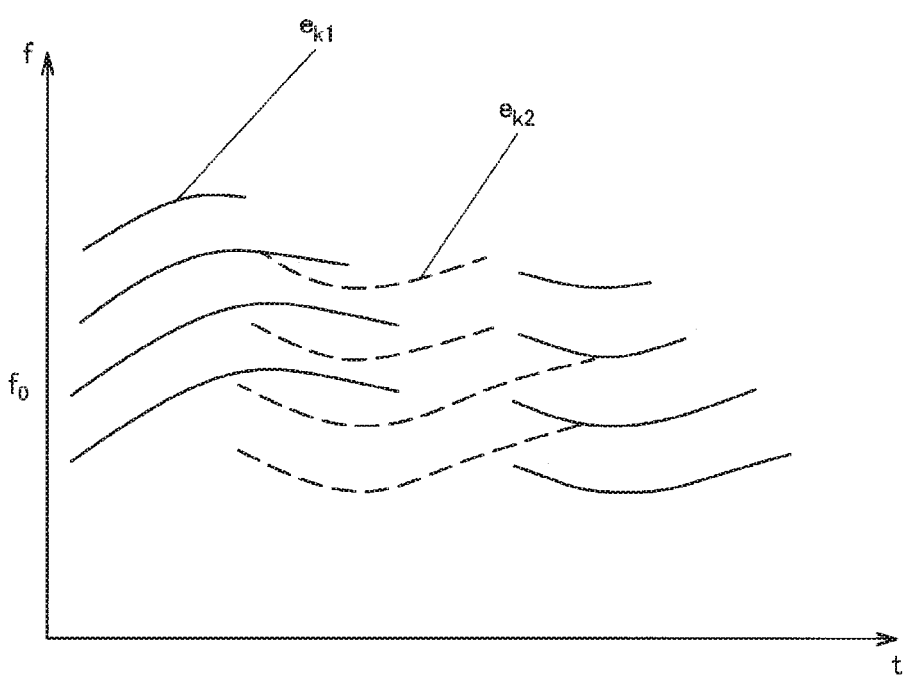
FIG. 5 is a diagram illustrating an example of a spectrum of a sound arriving from each sound source in a case in which two sound sources are located in mutually different directions.

Also, in a case in which there are a plurality of sound sources, a value of the estimated $e_k$ indicates the direction of the sound source when a sound arriving from a sound source at a certain frequency is dominant. Accordingly, in a case in which there is a band in which there is no superimposition on the frequency between the sound sources, the direction of each sound source can be estimated by using information regarding the band. For example, FIG. 5 is a diagram illustrating an example of a spectrum of a sound arriving from each sound source in a case in which two sound sources are located in mutually different directions. In FIG. 5, the horizontal axis represents time t and the vertical axis represents a frequency f of an observed signal. Also, in the example illustrated in FIG. 5, examples of spectra of sounds arriving from sound sources located in mutually different directions $e_{k1}$ and $e_{k2}$ are illustrated.

Figure 6:
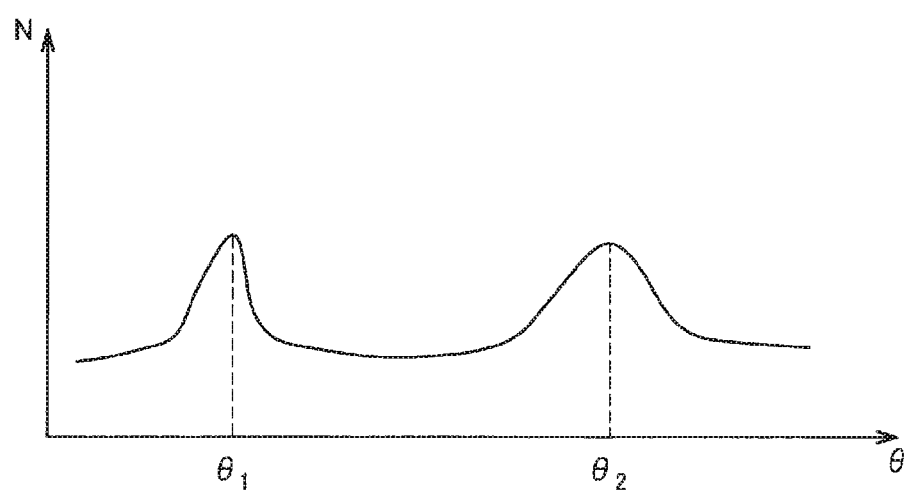
FIG. 6 is an exemplary graph illustrating an estimation result in an arrival direction of the sound based on the spectrum illustrated in FIG. 5 as a histogram.

Here, when the arrival direction $e_k$ of the sound at each time and each frequency (that is, a plurality of (ω, t)) is calculated on the basis of the spectrum illustrated in FIG. 5 and calculation results of the arrival direction $e_k$ are counted in each arrival direction to generate a histogram, the histogram is illustrated in FIG. 6. FIG. 6 is an exemplary graph illustrating an estimation result in an arrival direction of the sound based on the spectrum illustrated in FIG. 5 as the histogram. In FIG. 6, the horizontal axis represents a traveling direction θ of the sound (in other words, the arrival direction of the sound) and the vertical axis represents a count value N of the arrival direction $e_k$ of the sound calculated in the plurality of (ω, t). That is, the example illustrated in FIG. 6 shows a high possibility of a sound source being located in a direction of each of $\theta_1$ and $\theta_2$.

Also, distortion occurs in the estimation result of the arrival direction $e_k$ of the sound due to an influence of superimposition of the spectrums or an abnormal portion included in a sound arrived from a sound source in some cases. However, in a case in which the conditions indicated by the above-described assumptions (1) to (4) are satisfied, the arrival direction $e_k$ can be estimate correctly in many cases. Therefore, for example, the histogram illustrated in FIG. 6 can be generated and the arrival direction of the sound from each sound source (that is, the direction of each sound source) can be estimated from peak values of the histogram.

The example of the method of estimating the direction of the sound source in a case in which the sound from the sound source and the path of the sound collection portion are generalized has been described above with reference to FIGS. 5 and 6. Also, as understood from the above-described content, the information processing system 1 according to the embodiment is not particularly limited to the aspect (for example, the path along which the sound collection portion 301 is moved) in which at least one of the position and the direction of the sound collection portion 301 is changed when the frequency of the sound signal based on the sound collection result by the sound collection portion 301 is changed by the Doppler effect.

2.4. Case in which Observation Points are Close to Sound Sources

Next, an example of a method of estimating a direction of a sound source in a case in which the position of the sound source is close to the sound collection portion, that is, a case in which an assumption that a sound arriving from the sound source is a plane wave is not established, will be described with reference to FIGS. 7 to 10.

Figure 7:
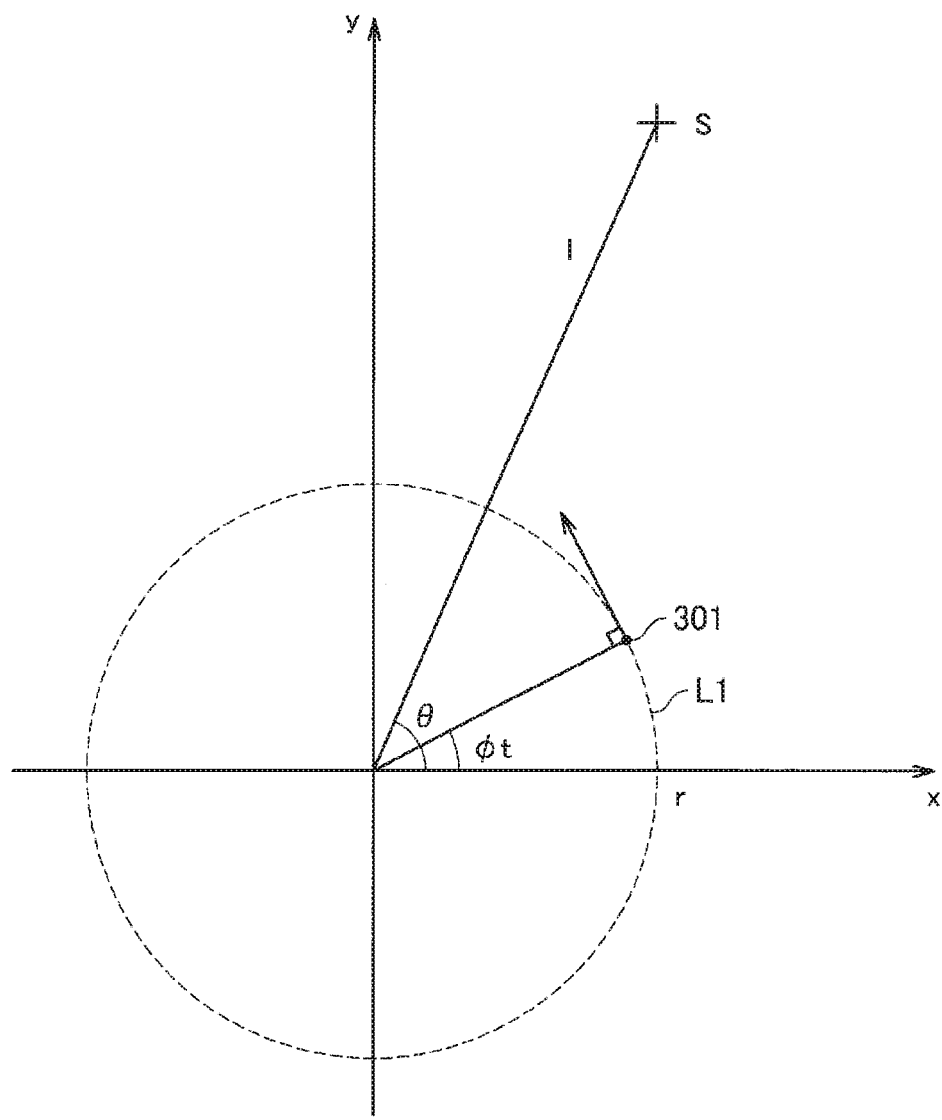
FIG. 7 is a diagram schematically illustrating an example of a spatially positional relation between the sound collection portion and a sound source in a case in which the position of the sound source is close to the sound collection portion.

For example, FIG. 7 is a diagram schematically illustrating an example of a spatially positional relation between the sound collection portion 301 and a sound source in a case in which the position of the sound source is close to the sound collection portion 301. Also, to further facilitate the method of estimating the direction of the sound source in the description, it is assumed that a sound arriving from the sound source is a single sine wave with the frequency $f_0$ and the sound collection portion 301 is moved along a circular path L1 with the radius r at an angular velocity φ as in the example illustrated in FIG. 3. Also, in FIG. 7, reference numeral S indicates the position of a sound source. In addition, reference numeral 1 indicates a distance between the sound source S and a rotation center of the path L1 along which the sound collection portion 301 is moved. At this time, an instantaneous frequency f of a signal observed in the sound collection portion 301 by the Doppler effect (that is, an observed signal) is expressed in a calculation equation indicated as the following (Equation 8).

[Math. 8]

$$f = f_0\left(1 + \frac{rl\phi}{cR}\sin(\phi t + \phi_0 + \theta)\right)$$
$$R = (r^2 + l^2 + 2rl\cos(\phi t - \phi_0 - \theta))^{1/2}$$

(Equation 8)

Figure 8:
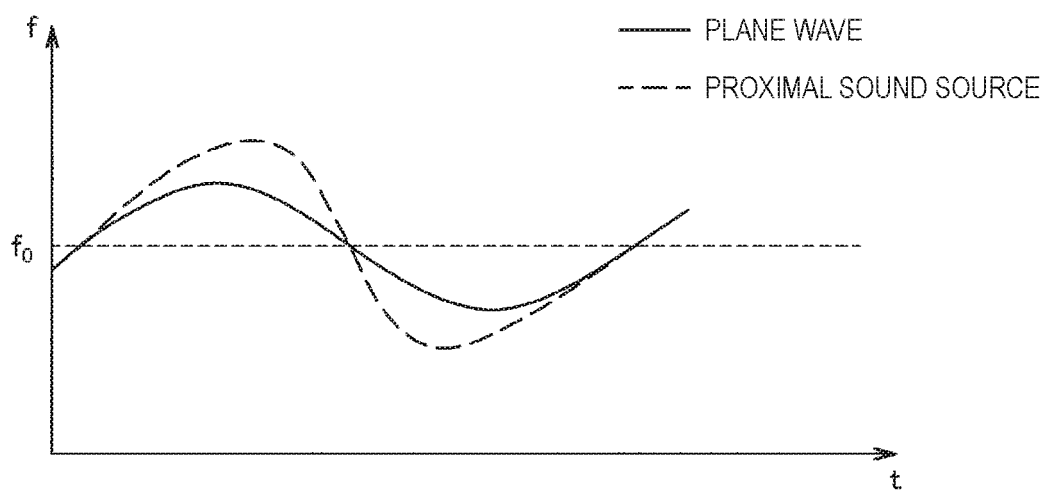
FIG. 8 is a diagram illustrating an example of an observation result of a sound arriving from a proximal sound source.

Also, in the foregoing (Equation 8), $\phi_0$ is assumed to indicate an angle at t=0. For example, FIG. 8 is a diagram illustrating an example of an observation result of a sound arriving from a proximal sound source. In FIG. 8, the horizontal axis represents time t and the vertical axis represents a frequency f of the observed signal. Also, in the example illustrated in FIG. 8, an example of an observation result in a case in which a sound is regarded as a plane wave is suggested as a reference in addition to an observation result of the sound from the proximal sound source. Referring to the foregoing (Equation 8) and FIG. 6, it can be understood that in the case of the proximal sound source, a period and a phase are still reserved although distortion occurs in a signal modulated by the Doppler effect. Therefore, a direction $\theta$ of the sound source can be estimated from the phase of the signal modulated by the Doppler effect.

Specifically, in a case in which $\theta$ is the direction of the sound source, a steady frequency is modulated to $\sin(\phi_t + \phi_0 + \theta)$ (for example, see the above-described (Equation 2)). Therefore, the direction of the sound source can be estimated as a phase difference $\theta$ from $f=\sin(\phi_t + \phi_0)$. As a more specific example, a cross-correlation function may be calculated and the direction of the sound source may be obtained as the phase difference $\theta=\phi\Delta T$ from time $\Delta T$ at which a correlation value is the maximum. Also, in this case, the distance l between the observation point and the proximal sound source may be unknown.

Specifically, by calculating a cross correlation of the observation signal between $A_{ref}(f, t)$ and R in which $(f_0, \theta, l)=(f_0', \theta', l')$ is set in the foregoing (Equation 8) and obtaining $(f_0', \theta', l')$ I which the correlation value is the maximum, it is possible to estimate the phase difference $\theta=\theta'$. In this case, $A_{ref}(f, t)$ and R are indicated as the following (Equation 8a). Also, in this scheme, not only the direction but also the distance $l=l'$ to the sound source can be estimated. However, to obtain $A_{ref}(f, t)$ and R with high precision, it is necessary to solve a maximization problem with respect to three variables. Thus, a calculation amount further increases in some cases.

[Math. 9]

$$A_{ref}(f, t) = \delta\left(f - f_0'\left(1 + \frac{rl'\phi}{cR}\sin(\phi t + \phi_0 + \theta')\right)\right)$$
$$R = (r^2 + l'^2 + 2rl'\cos(\phi t - \phi_0 - \theta'))^{1/2}$$

(Equation 8a)

Figure 9:
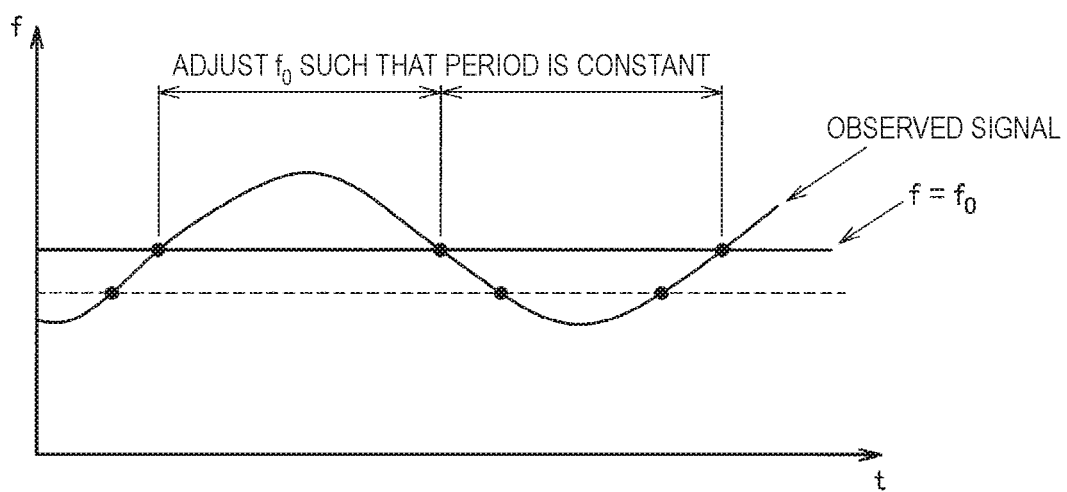
FIG. 9 is an explanatory diagram illustrating an example of a method of calculating a phase difference at the time of modulation by the Doppler effect.
Figure 10:
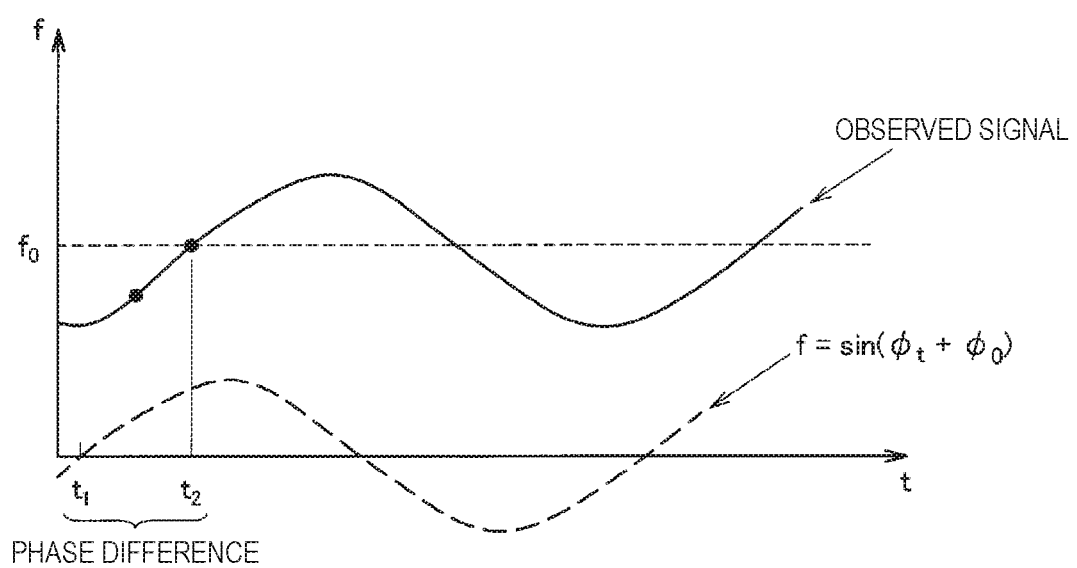
FIG. 10 is an explanatory diagram illustrating the example of the method of calculating the phase difference at the time of modulation by the Doppler effect.

In addition, another example of the method of deriving the phase difference $\theta$ will be described below with reference to FIGS. 9 and 10. FIGS. 9 and 10 are explanatory diagrams illustrating an example of a method of calculating a phase difference at the time of modulation by the Doppler effect. In FIGS. 9 and 10, the horizontal axis represents time t and the vertical axis represents a frequency f.

First, as illustrated in FIG. 9, the frequency $f_0$ is derived such that a period of an intersection point of a straight line $f=f_0$ and an observed signal is constant. Subsequently, as illustrated in FIG. 10, zero point time $t_1=(n\pi-\phi_0)/\phi$ of $f=\sin(\phi t+\phi_0)$ and time $t_2$ at which the straight line $f=f_0$ and the observed signal intersect each other are derived. Then, the phase difference $\theta=\phi(t_2-t_1)$ may be calculated on the basis of the derived times $t_1$ and $t_2$. Also, even in this case, the distance l between an observation point and the proximal sound source may be unknown.

In addition, in a case in which the distance l between an observation point and the proximal sound source can be specified by any method, it is needless to say that the arrival direction of the sound (that is, the direction of the sound source) can be estimated on the basis of the above-described (Equation 8).

The example of the method of estimating the direction of the sound source in the case in which the position of the sound source is close to the sound collection portion, that is, the case in which an assumption that a sound arriving from the sound source is a plane wave is not established, has been described above with reference to FIGS. 7 to 10.

2.5. Separation of Sound Sources and Application to Beamforming

As described above, in the information processing system 1 according to the embodiment, the arrival direction of the sound (the direction of the sound source) at each frequency bin can be estimated. Therefore, as described above, for example, by multiplying the acquired observed signal by the gain value in accordance with the direction, it is possible to emphasize or suppress the sound arriving from the desired direction.

Also, the sound obtained in the information processing system 1 according to the embodiment is a sound modulated and distorted by the Doppler effect. However, for example, by inversely correcting the modulation by the Doppler effect on the basis of the above-described (Equation 3), it is possible to acquire the sound with small distortion as in a case in which the sound collection portion 301 stops.

In addition, a case in which an estimation result of the direction of the sound source is sharply changed with movement of the sound source, a calculation error, or the like, a filter gain is sharply changed, and musical noise occurs can be assumed. In this case, for example, to avoid the occurrence of the musical noise, a process of smoothing the estimation result in the direction of the sound source or the filter gain value in the time direction may be added.

In particular, the details of the process related to the estimation of the direction of the sound source by the information processing device 10 have been described above as the technical features according to the embodiment.

3. Modification Examples

Next, modification examples of the information processing system 1 according to the embodiment will be described.

3.1. Modification Example 1: Example of Case in which Plurality of Sound Collection Portions are Used First, an example of a structure in which performance (for example, a resolution) related to estimation of a direction of a sound source can be further improved by using the plurality of sound collection portions 301 will be described as Modification Example 1.

As described above, in the information processing system 1 according to the embodiment, a direction of each of the plurality of sound sources can be estimated by the single sound collection portion 301. On the other hand, a resolution related to estimation of a direction of a sound source depends on the degree of a steady property or the like of a sound from the sound source or a movement velocity of the sound collection portion 301 in some cases. For example, in a case in which the movement velocity of the sound collection portion 301 is excessively slow, it is difficult to observe an influence of the Doppler effect. In particular, it is difficult to estimate directions in a case in which there are a plurality of sound sources in some cases. On the other hand, in a case in which the movement velocity of the sound collection portion 301 is excessively fast, a change in an instantaneous frequency becomes sharp and peaks of a spectrum become dull. Thus, it is difficult to estimate a direction of a sound source with high precision in some cases. In addition, there is a hardware constraint of the driving portion 305 or the like moving the sound collection portion 301 on the movement speed of the sound collection portion 301. In particular, it is difficult to move the sound collection portion 301 faster. Accordingly, in the information processing system according to Modification Example 1, even under the above-described constraint, performance (for example, a resolution) related to estimation of a direction of a sound source can be further improved by using the plurality of sound collection portions 301.

Figure 11:
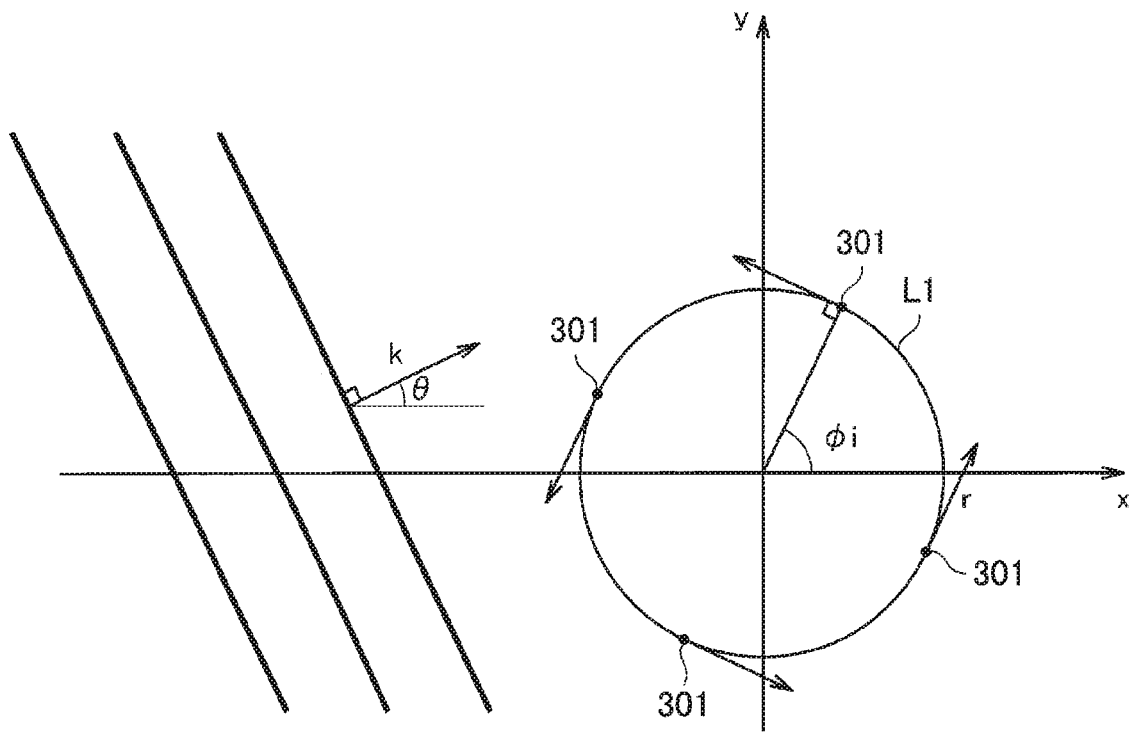
FIG. 11 is an explanatory diagram illustrating an overview of the information processing system according to Modification Example 1.
Figure 12:
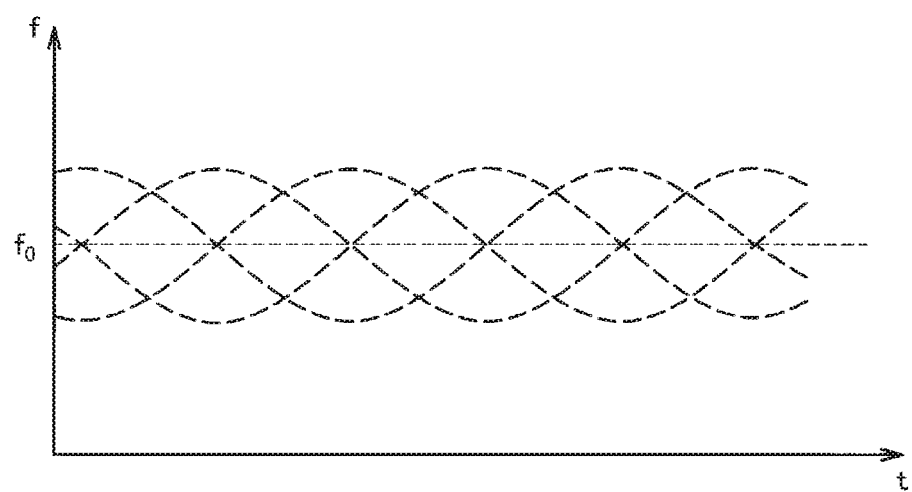
FIG. 12 is a diagram illustrating an example of an observation result of sounds by the plurality of sound collection portions.

For example, the FIG. 11 is an explanatory diagram illustrating an overview of the information processing system 1 according to Modification Example 1 and a diagram schematically illustrating an example of a spatially positional relation between each sound collection portion 301 and a sound in a case in which the plurality of sound collection portions 301 are used. Also, in the description, as illustrated in FIG. 11, each of the plurality of sound collection portions 301 is assumed to be moved along the same circular path L1 and a sound arriving from a sound source is regarded as a plane wave. In addition, FIG. 12 is a diagram illustrating an example of an observation result of sounds by the plurality of sound collection portions 301. In FIG. 12, the horizontal axis represents time t and the vertical axis represents a frequency f.

As a specific example, the information processing device 10 estimates an arrival direction of a sound source on the basis of a sound signal collected by each of the plurality of sound collection portions 301. Also, as understood from FIG. 12, phases of observed signals acquired from the plurality of sound collection portions 301 deviate from each other due to a difference in a relative positional relation between the sound collection portions 301. Therefore, the information processing device 10 shifts and adds the histogram in accordance with the estimation result in the arrival direction of the sound source corresponding to each sound collection portion 301 by a phase resulting from a difference in a relative positional relation between the plurality of sound collection portions 301. Through this process, the information processing device 10 can acquire a sharper histogram as an estimation result of the direction of the sound source and can estimate the direction of the sound source on the basis of a peak value of the histogram with high precision.

In addition, as another example, a method of calculating an amplitude spectrum from a frequency of a sound signal (that is, an observed signal) observed by each sound collection portion 301 and estimating the direction of the sound source on the basis of the amplitude spectrum can be exemplified. In the description, to further facilitate the method of estimating the direction of the sound source, a situation in which a plane wave of a single sine wave with the frequency $f_0$ arrives from a θ direction will be focused on for the description.

Specifically, when $\phi_0, \ldots, \phi_N$ are angles of N sound collection portions 301 located on the same circular path L1 at time t=0, a frequency $f_i$ of a sound signal (that is, an observed signal) measured by an i-th sound collection portion 301 is expressed in a calculation equation indicated as the following (Equation 9).

[Math. 10]

$$f_i = \left(1 + \frac{r\phi}{c}\sin(\phi t + \phi_i + \theta)\right)f_0 \quad \text{(Equation 9)}$$

Here, when it is assumed that $A^i(f_i)$ is an amplitude spectrum of the sound signal observed by the i-th sound collection portion 301 and θ' is an unknown arrival direction, a sum A(f) of an amplitude spectrum in which an influence of the Doppler effect is corrected is expressed in a calculation equation indicated as the following (Equation 10). Also, "A" is assumed to indicate a letter with tilde on "A."

[Math. 11]

$$\overline{A}(f) \equiv \frac{1}{N}\sum_{i=0}^{N} A^i\left(\left(1 + \frac{r\phi}{c}\sin(\phi t + \phi_i + \theta')\right)f\right) \quad \text{(Equation 10)}$$

Figure 13:
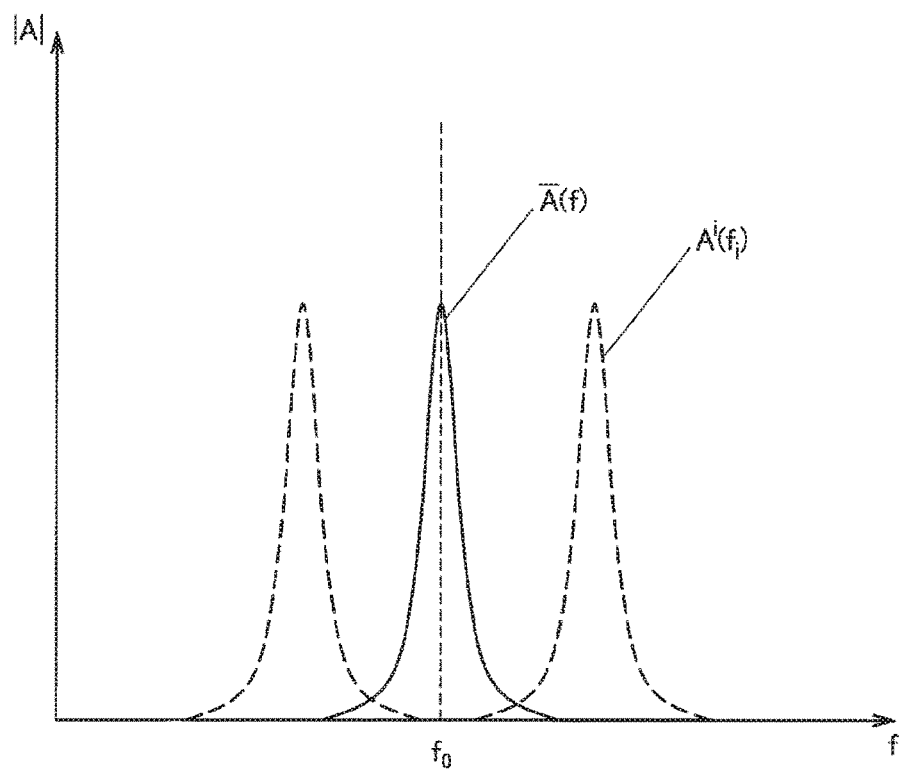
FIG. 13 is a diagram illustrating an example of an amplitude spectrum calculated on the basis of a sound collection result of each of the plurality of sound collection portions.

For example, FIG. 13 is a diagram illustrating an example of an amplitude spectrum calculated on the basis of a sound collection result of each of the plurality of sound collection portions 301 and illustrating an example of an amplitude spectrum in a case in which θ=θ' in the above-described (Equation 10). In FIG. 13, the horizontal axis represents a frequency f and the vertical axis represents an amplitude |A|. Referring to FIG. 13, it can be understood that frequencies in a case in which the influence of the Doppler effect is corrected for the observed signal at θ=θ' substantially match each other among the plurality of sound collection portions 301 and a peak of the spectrum becomes sharper and takes a maximum value.

By obtaining —θ' at which the sum A(f) of the amplitude spectrum takes the maximum value most sharply on the basis of the characteristic, it is possible to estimate the arrival direction of the sound (that is, the direction of the sound source). Also, in this case, since the sound in the θ direction can be further emphasized, the sum A(f) can be used for beamforming, separation of the sound source, or the like.

Figure 14:
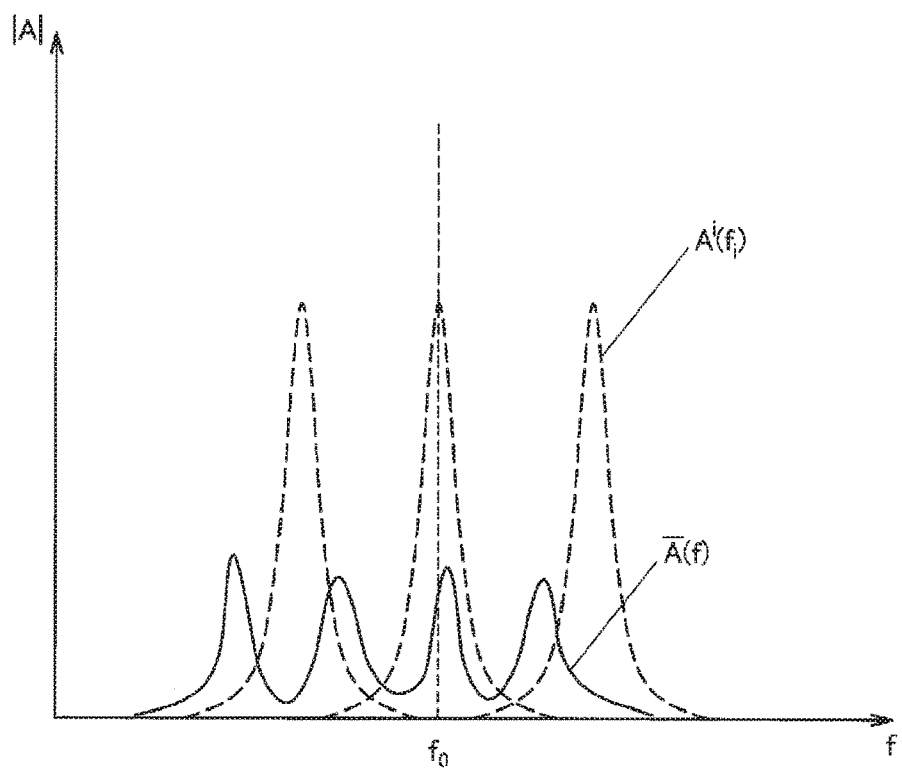
FIG. 14 is a diagram illustrating another example of the amplitude spectrum calculated on the basis of the sound collection result of each of the plurality of sound collection portions.

In addition, since the relation equation expressed above as (Equation 10) is established at any frequency f, the sound arriving from the sound source is not necessarily limited to the single sine wave and any spectrum may be used. For example, FIG. 14 is a diagram illustrating another example of the amplitude spectrum calculated on the basis of a sound collection result of each of the plurality of sound collection portions 301 and an example of a spectrum in a case in which the sum A(f) of the amplitude spectrum is obtained assuming a different arrival direction (that is, θ≠θ') from the original arrival direction θ of the sound. In this case, since the spectrum after the correction of the amplitude spectrum $A^i(f_i)$ corresponding to each sound collection portion 301 is not superimposed, as illustrated in FIG. 14, the peak value is smaller than in the example illustrated in FIG. 13 and a spectrum with a widened foot shape is formed.

The example of the structure in which the performance (for example, a resolution) related to estimation of the direction of the sound source can be further improved by using the plurality of sound collection portions 301 will be described above with reference to FIGS. 11 to 14 as Modification Example 1.

3.2. Modification Example 2: Combination with Other Direction Estimation Technologies Next, an example of a technology for further improving precision related to estimation of a direction of a sound source by combining a process related to the estimation of the direction of the sound source by the information processing system 1 according to the embodiment with a process related to another direction estimation technology will be described as Modification Example 2.

Specifically, under a situation in which much noise is mixed in various directions, it is difficult to calculate an observed signal after modulation in order to estimate an arrival direction of a sound from a target sound source in accordance with an arrival direction of the noise in some cases. In this case, for example, the information processing device 10 may estimate candidates of the position of the sound source by analyzing a video around an observation point and may estimate a direction of the sound source by combining the estimation result with an estimation result of the arrival direction of the sound based on an observed signal in the above-described sound collection portion 301.

Specifically, the information processing device 10 acquires the video around the observation point imaged by an imaging device or the like, extracts candidates (for example, people) of the sound source by executing various analysis processes such as image analysis on the acquired video, and estimates candidates of the direction of the sound source on the basis of an estimation result. Then, the information processing device 10 may apply a filter in which a sound arriving from the direction of the sound source estimated on the basis of the video is further emphasized when a sound signal (observed signal) based on the sound collection result of the sound collection portion 301 is analyzed. As a more specific example, by applying a filter in which a spectrum is smoothed by a frequency modulation method in accordance with the arrival direction of the sound, it is also possible to emphasize a sound arriving from a desired direction.

Also, the above-described example is merely an example. Another direction estimation technology for combining the process related to the estimation of the direction of the sound source by the information processing system 1 according to the embodiment is not necessarily limited to a technology based on analysis of a video as long as candidates of the direction of the sound source can be estimated.

The example of the technology for further improving the precision related to the estimation of the direction of the sound source by combining the process related to the estimation of the direction of the sound source by the information processing system 1 according to the embodiment with the process related to another direction estimation technology will be described above as Modification Example 2.

Figure 15:
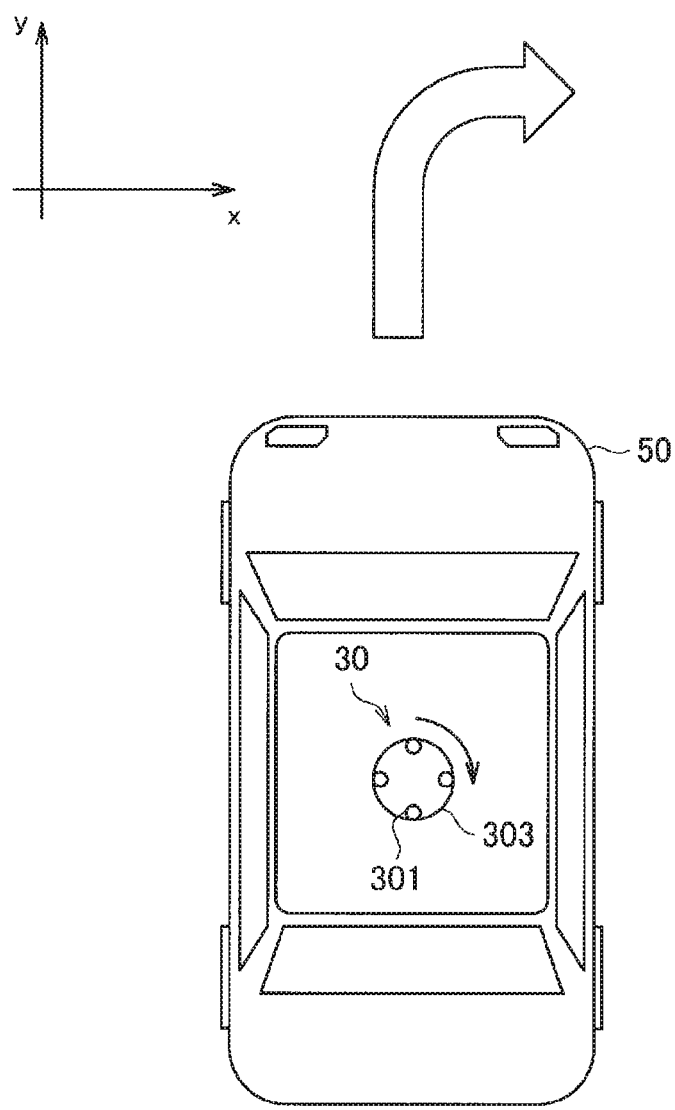
FIG. 15 is an explanatory diagram illustrating an overview of the information processing system according to Modification Example 3.

3.3. Modification Example 3: Example of Case in which Observation Points are Moved Next, an example of a case in which the information processing system 1 according to the embodiment is applied to a moving object such as an automobile (vehicle) will be described as Modification Example 3. For example, FIG. 15 is an explanatory diagram illustrating an overview of the information processing system 1 according to Modification Example 3. In the example illustrated in FIG. 15, the sound collection unit 30 is mounted on a moving object 50 (for example, an automobile, a train, or a bicycle) and the sound collection unit 30 is also moved with movement of the moving object 50. Also, in the description, the sound collection portion 301 is assumed to be moved along a circular path. In addition, in the example illustrated in FIG. 15, the moving object 50 is assumed to be moved on the xy plane.

In this case, for example, the information processing device 10 recognizes a movement velocity of the moving object 50. As a specific example, the information processing device 10 may acquire information indicating a movement velocity (for example, a value of a velocimeter or information indicating content of handle manipulation) from the moving object 50 and may recognize the movement velocity of the moving object 50 in accordance with the acquisition result. In addition, the information processing device 10 may recognize a movement velocity of the moving object 50 on the basis of a detection result of any of various sensors such as an acceleration sensor. In addition, as another example, the information processing device 10 may calculate the movement velocity of the moving object 50 on the basis of a positioning result of the position of the moving object 50 by Global Positioning System (GPS). Of course, the information processing device 10 may recognize a movement velocity of the moving object 50 by combining two or more methods among the above-described various methods.

Figure 16:
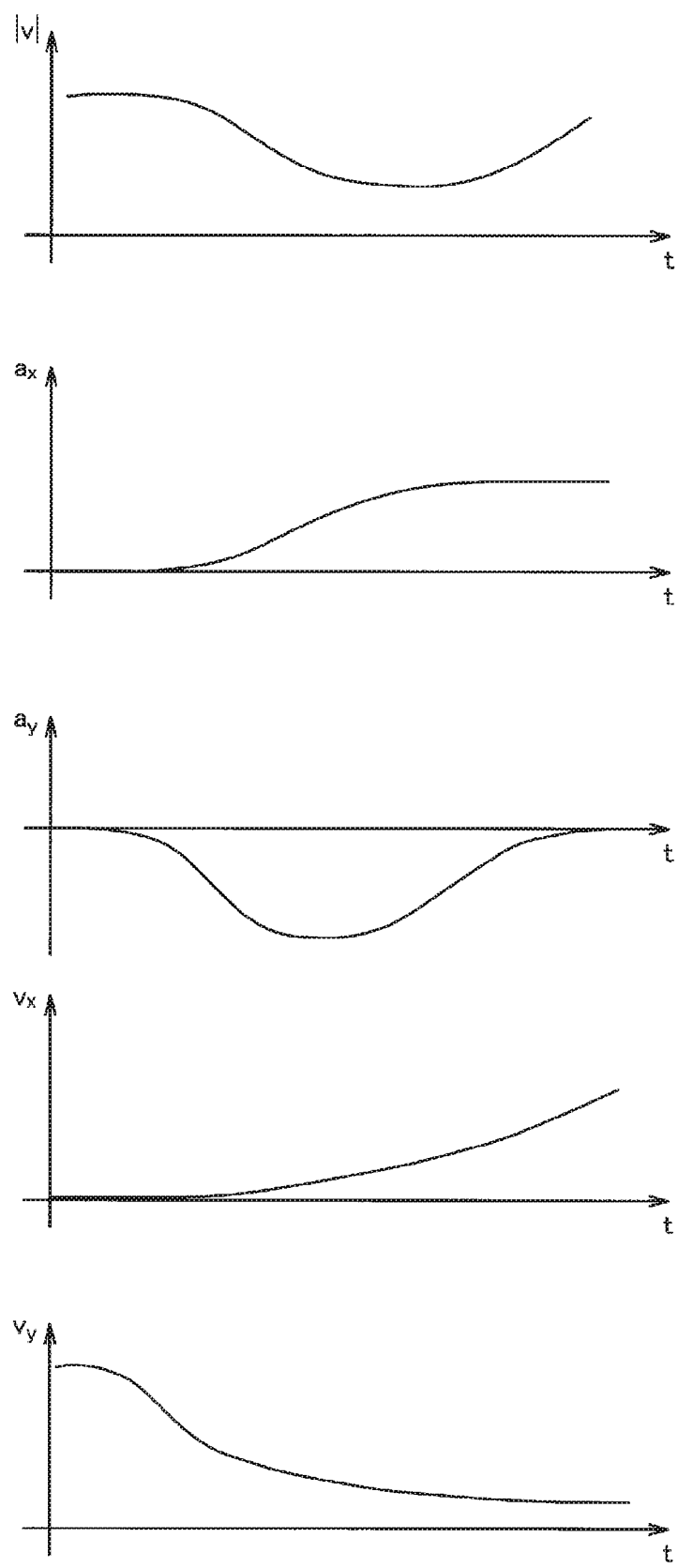
FIG. 16 is a diagram illustrating examples of detection results of a velocity and acceleration of a moving object in which a sound collection unit is installed.

For example, FIG. 16 is a diagram illustrating examples of detection results of a velocity and acceleration of the moving object 50 in which the sound collection unit 30 is installed. In FIG. 16, the horizontal axis of each graph represents a time. In addition, in FIG. 16, |v| indicates the absolute of a velocity of the moving object 50 and can be acquired as, for example, a value of a velocimeter. In addition, $a_x$ indicates acceleration applied to the moving object 50 in the x direction and $a_y$ indicates acceleration applied to the moving object 50 in the y direction. Also, for example, the accelerations $a_x$ and $a_y$ can be acquired as detection results of the acceleration sensor. In addition, $v_x$ indicates an x direction component of a movement velocity of the moving object 50 and $v_y$ indicates a y direction component of the movement velocity of the moving object 50. Also, the velocity $v_x$ of the moving object 50 in the x direction can be calculated as a time-direction integrated value of the acceleration $a_x$ applied in the x direction. Similarly, the velocity $v_y$ of the moving object 50 in the y direction can be calculated as a time-direction integrated value of the acceleration $a_y$ applied in the y direction.

Then, the information processing device 10 calculates a movement velocity of the sound collection portion 301 in association with the movement of the moving object 50 by adding the velocity of the moving object 50 as a bias to the velocity of the sound collection portion 301 moved along the circular path relative to the moving object 50. Here, when $v_{car}$ is a velocity of the moving object 50 and $v_{mic}$ is a velocity of the sound collection portion 301 moved along the circular path relative to the moving object 50, a movement velocity $v_{total}$ of the sound collection portion 301 in association with the movement of the moving object 50 is expressed in a calculation equation indicated as the following (Equation 11).

[Math. 12]

$$v_{total} = v_{car} + v_{mic} \qquad \text{(Equation 11)}$$

Also, the subsequent processes are the same as those according to the above-described embodiment. As a specific example, the information processing device 10 may estimate a direction of a sound source with respect to the sound collection unit 30 (further, the moving object 50) on the basis of the process described above with reference to (Equation 3) to (Equation 7). In this configuration, for example, by applying the information processing system 1 to an automobile to estimate an arrival direction of a siren or an arrival direction of a running sound of another automobile located in a blind area, it is possible to apply to ascertaining of a surrounding situation or danger sensing.

Also, the type of moving object 50 is not necessarily limited and a motion of the moving object 50 is not limited to a plane motion illustrated in FIG. 15 either. As a specific example, the moving object 50 may be a small unmanned aircraft such as a so-called drone. In this case, the information processing device 10 installed in the moving object 50 which is a small unmanned aircraft may estimate a direction of a sound source (that is, an arrival direction of a sound) 3-dimensionally by analyzing a velocity of the sound collection portion 301 or a traveling direction of the sound 3-dimensionally.

In addition, in a case in which the moving object 50 moved 3-dimensionally at a relatively high speed, such as a small unmanned aircraft, is applied, a direction of a sound source can be detected in some cases by monitoring a movement of the moving object 50 even in a case in which a rotational mechanism rotating the sound collection portion 301 is not provided. Specifically, a velocity of the moving object 50 may be estimated by an acceleration sensor, an ultrasonic sensor, a pressure sensor, GPS, or the like, the velocity may be regarded as a movement velocity of the sound collection portion 301, and a direction of a sound source may be estimated. In the case of this configuration, for example, by estimating an arrival direction of a sound while the moving object 50 moves around and aggregating the estimation result, it is possible to estimate a position of the sound source on the basis of an aggregation result.

In addition, in a case in which the moving object 50 such as a so-called drone sounds, for example, mutual positions of the plurality of moving objects 50 can also be ascertained. In this case, for example, one moving object 50 may regard another moving object 50 as a sound source and estimate a position or a direction of the other moving object 50.

The example of the case in which the information processing system 1 according to the embodiment is applied to a moving object such as an automobile will be described above with reference to FIGS. 15 and 16 as Modification Example 3.

3.4. Modification Example 4: Indoor Application Example

Next, an example of a case in which the information processing system 1 according to the embodiment is applied to a device installed indoors will be described as Modification Example 4. For example, FIG. 17 is an explanatory diagram illustrating an overview of the information processing system 1 according to Modification Example 4 and illustrating an example of a case in which the information processing system 1 is applied to a ceiling fan set indoors.

Figure 17:
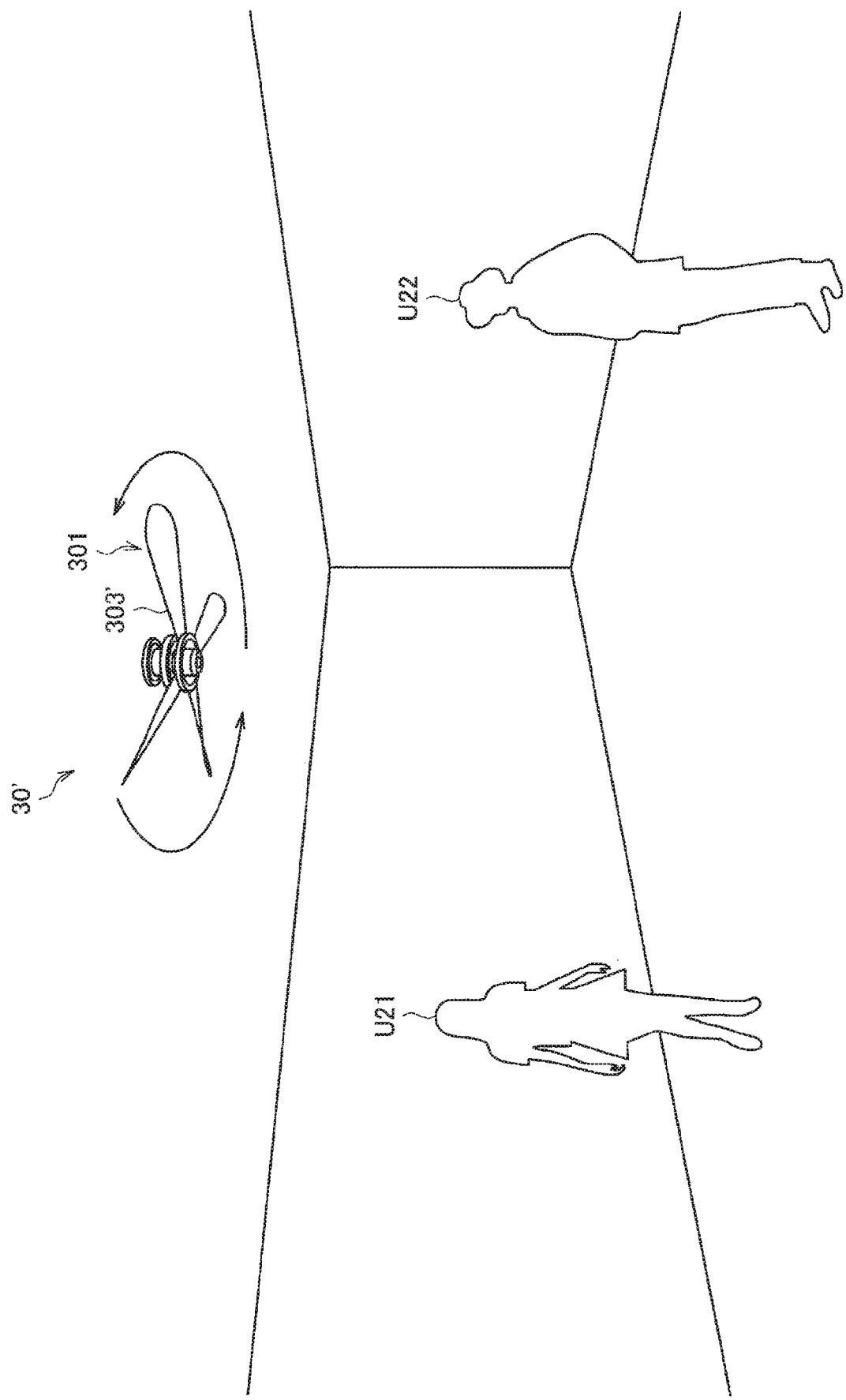
FIG. 17 is an explanatory diagram illustrating an overview of the information processing system according to Modification Example 4.

Specifically, in the example illustrated in FIG. 17, a ceiling fan 30' installed on a ceiling is used as the above-described sound collection unit 30 (for example, see FIG. 1) and a rotary wing 303' of the ceiling fan is used as the support portion 303 supporting the sound collection portion 301. In this configuration, when the rotary wing 303' of the ceiling fan begins, the sound collection portion 301 is moved along a circular path. At this time, for example, voice output from a user U21 or U22 is modulated by an influence of the Doppler effect when the voice is collected by the sound collection portion 301. That is, in the example illustrated in FIG. 17, a direction of each of the users U21 and U22 with respect to the ceiling fan 30' (that is, the sound collection unit 30) can be estimated on the basis of a sound collection result of the voice from the users U21 and U22.

In this configuration, for example, in a case in which voice is input, a direction of a user speaking the voice (that is, a speaking person) can be estimated and a service can be provided for the user. Also, at this time, the system may be configured such that, for example, an individual user can be specified by combining with an image recognition technology or the like and a service in accordance with an individually specifying result can be provided.

In addition, as in the example illustrated in FIG. 17, by using the ceiling fan 30' as the sound collection unit 30, it is possible to fix the position of the sound collection portion 301 without much occupying a location than in a case in which the sound collection portion is installed on a floor or a table. In addition, as illustrated in FIG. 17, in a case in which the ceiling fan 30' is used as the sound collection unit 30, there is a high possibility of the sound collection unit 30 (that is, the ceiling fan 30') being installed near the middle of a room and there is a low possibility of an obstacle being interposed between the sound collection unit and a sound source (for example, a user). Therefore, as illustrated in FIG. 17, by using the ceiling fan 30' as the sound collection unit 30, it is possible to estimate a direction of the sound source (for example, a user) with more precision.

The example of the case in which the information processing system 1 according to the embodiment is applied to a device installed indoors will be described above with reference to FIG. 17 as Modification Example 4. Also, in Modification Example 4, the case in which the ceiling fan is used as the sound collection unit 30 has been described. It is needless to say that a device which can be used as the sound collection unit 30 is not limited to only the ceiling fan. More specifically, a device can be used as the sound collection unit 30 as long as the device has at least a part of a mechanism moving at a sufficiently faster velocity than a movement velocity of an assumed sound source.

4. Hardware Configuration

Figure 18:
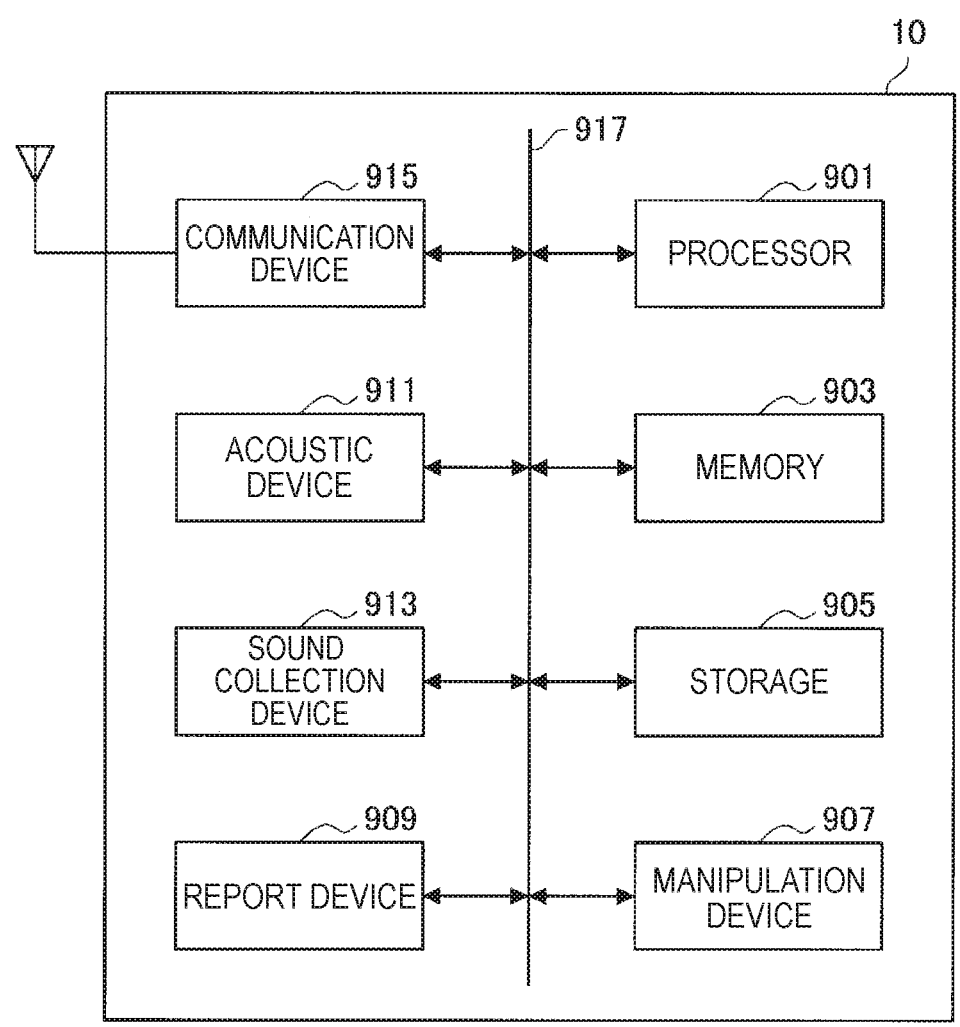
FIG. 18 is a diagram illustrating an example of a hardware configuration of an information processing device according to the embodiment.

Next, an example of a hardware configuration of the information processing device 10 (that is, the above-described signal processing devices 11 to 14) according to each embodiment of the present disclosure will be described with reference to FIG. 18. FIG. 18 is a diagram illustrating an example of a hardware configuration of the information processing device 10 according to the embodiment of the present disclosure.

As illustrated in FIG. 18, the information processing device 10 according to the embodiment includes a processor 901, a memory 903, a storage 905, a manipulation device 907, a report device 909, a sound collection device 913, and a bus 917. In addition, the information processing device 10 may include at least one of an acoustic device 911 and a communication device 915.

The processor 901 may be, for example, a central processing unit (CPU), a graphics processing unit (GPU), a digital signal processor (DSP), or a system on chip (SoC) and executes various processes of the information processing device 10. The processor 901 can include, for example, an electronic circuit that executes various arithmetic processes. Also, the analysis unit 101, the driving control unit 103, and the process execution unit 105 described above can be realized by the processor 901.

The memory 903 includes a random access memory (RAM) and a read-only memory (ROM) and stores data and a program executed by the processor 901. The storage 905 can include a storage medium such as a semiconductor memory or a hard disk. For example, the above-described storage unit 107 can be realized by at least one of the memory 903 and the storage 905 or a combination of the memory 903 and the storage 905.

The manipulation device 907 has a function of generating an input signal so that a user executes a desired manipulation. The manipulation device 907 can include, for example, a touch panel. In addition, as another example, the manipulation device 907 may include, for example, an input unit such as a button, a switch, or a keyboard used by the user to input information and an input control circuit that generate an input signal on a basis of an input by the user and supplies the input signal to the processor 901.

The report device 909 is an example of an output device and may be, for example, a device such as a liquid crystal display (LCD) device or an organic light emitting diode (OLED) display. In this case, the report device 909 can report predetermined information to the user by displaying the information on a screen.

Also, the example of the report device 909 described above is merely an example. The aspect of the report device 909 is not particularly limited as long as predetermined information can be reported to a user. As a specific example, the report device 909 may be a device that reports predetermined information to a user by a blinking pattern as in a light emitting diode (LED). In addition, the report device 909 may also be a device that reports predetermined information to a user by executing vibration as in a so-called vibrator.

The acoustic device 911 is a device that reports predetermined information to a user by outputting a predetermined acoustic signal as in a speaker or the like.

The sound collection device 913 is a device that collects a voice spoken from a user or an acoustic sound of a surrounding environment and acquires the sound or the acoustic sound as acoustic information (acoustic signal) as in a microphone. In addition, the sound collection device 913 may acquire data indicating an analog acoustic signal indicating the collected sound or acoustic sound as acoustic information or may convert the analog acoustic signal into a digital acoustic signal and acquire data indicating the converted digital acoustic signal as acoustic information. Also, the above-described sound collection portion 301 can be realized by the sound collection device 913.

The communication device 915 is communication means included in the information processing device 10 and communicates with an external device via a network. The communication device 915 is a wired or wireless communication interface. In a case in which the communication device 915 is a wireless communication interface, the communication device 915 may include a communication antenna, a radio frequency (RF) circuit, and a baseband processor.

The communication device 915 has a function of executing various kinds of signal processing on a signal received from an external device and can supply a digital signal generated from a received analog signal to the processor 901.

The bus 917 connects the processor 901, the memory 903, the storage 905, the manipulation device 907, the report device 909, the acoustic device 911, the sound collection device 913, and the communication device 915. The bus 917 may include a plurality of types of buses.

In addition, a program that causes hardware such as a processor, a memory, and a storage contained in a computer to exert the same functions as the configuration of the foregoing information processing device 10 can also be generated. In addition, a computer-readable storage medium recording the program can also be provided.

5. Conclusion

As described above, in the information processing system 1 according to the embodiment, the sound collection portion 301 collects a sound from at least one sound source by changing at least one of a position and a direction of the sound collection portion 301 in a predetermined pattern (for example, moving the sound collection portion along a predetermined path). Then, the information processing device 10 estimates the direction of the sound source of the collected sound by using a characteristic in which a frequency of a sound signal based on the sound collected by the sound collection portion 301 is changed due to an influence of the Doppler effect in association with the change in the position and the direction of the sound collection portion 301.

In this configuration, the information processing system 1 according to the embodiment can estimate the direction of each of the plurality of sound sources with a higher resolution by providing at least one sound collection portion 301 under a situation in which there are the plurality of sound sources around. That is, in the information processing system 1 according to the embodiment, both a reduction in the number of sound collection portions 301 and an improvement in a resolution in estimation of a direction of a sound source are compatible. In addition, in the information processing system 1 according to the embodiment, since the number of sound collection portions 301 can be further reduced, it is possible to reduce various kinds of costs and lighten the weight of the sound collection portions.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire a sound collection result of a sound from each of one or more sound sources obtained by a sound collection portion of which positional information indicating at least one of a position and a direction is changed in a predetermined pattern; and an estimation unit configured to estimate a direction of each of the one or more sound sources on a basis of a change in a frequency of a sound collected by the sound collection portion in association with a change in the positional information of the sound collection portion.

(2)

The information processing device according to (1), including a driving control unit configured to control an operation of a driving portion that changes the positional information of the sound collection portion in the predetermined pattern.

(3)

The information processing device according to (2), in which the driving control unit controls the operation of the driving portion such that the positional information of the sound collection portion is changed along a substantially circular predetermined path.

(4)

The information processing device according to any one of (1) to (3), in which the estimation unit estimates the direction of each of the one or more sound sources on a basis of the change in the positional information of the sound collection portion and a ratio of a change in a time direction of a spectrum of a sound collected by the sound collection portion to a change in a frequency direction of the spectrum.

(5)

The information processing device according to any one of (1) to (4), including a sound control unit configured to control an amplitude of a sound which arrives from at least one direction and is collected on a basis of an estimation result of the direction of each of the one or more sound sources.

(6)

The information processing device according to any one of (1) to (5), in which the acquisition unit acquires a sound collection result of a sound by each of a plurality of the sound collection portions, and the estimation unit estimates the direction of each of the one or more sound sources on a basis of the change in the frequency of the sound collected by each of the plurality of sound collection portions in association with movement of each of the plurality of sound collection portions.

(7)

The information processing device according to any one of (1) to (6), in which the sound collection portion is supported by a predetermined moving object such that the positional information is changed relative to the moving object in the predetermined pattern, and the estimation unit estimates the direction of each of the one or more sound sources on a basis of the change in the frequency of the sound in association with a change in at least one of a position and a direction of the predetermined moving object and a change in the positional information of the sound collection portion relative to the predetermined moving object.

(8)

The information processing device according to (7), in which the predetermined moving object is a vehicle.

(9)

The information processing device according to any one of (1) to (6), in which the sound collection portion is held with respect to a predetermined driver and the positional information of the sound collection portion is changed in the predetermined pattern by driving of the driver.

(10)

The information processing device according to (9), in which the driver is a rotator, and by rotation of the rotator, the positional information of the sound collection portion is changed along a substantially circular predetermined path.

(11)

The information processing device according to (10), in which the rotator is a rotary wing of a fan installed on a predetermined ceiling surface or wall surface.

(12)

The information processing device according to any one of (1) to (6), in which the sound source is another moving object that outputs a sound, and the estimation unit estimates a direction of the other moving object on the basis of the change in the frequency of the sound collected by the sound collection portion.

(13)

The information processing device according to (12), in which the estimation unit corrects an acquired estimation result of a position of the other moving object on a basis of an estimation result of the direction of the other moving object based on the change in the frequency of the sound collected by the sound collection portion.

(14)

The information processing device according to any one of (1) to (13), in which the acquisition unit acquires an image captured by an imaging unit, and the estimation unit estimates the direction of each of the one or more sound sources on a basis of an analysis result of the acquired image and the change in the frequency of the sound collected by the sound collection portion.

(15)

An information processing method including:

acquiring a sound collection result of a sound from each of one or more sound sources obtained by a sound collection portion of which positional information indicating at least one of a position and a direction is changed in a predetermined pattern; and estimating, by a processor, a direction of each of the one or more sound sources on a basis of a change in a frequency of a sound collected by the sound collection portion in association with a change in the positional information of the sound collection portion.

(16)

A program causing a computer to execute:

acquiring a sound collection result of a sound from each of one or more sound sources obtained by a sound collection portion of which positional information indicating at least one of a position and a direction is changed in a predetermined pattern; and estimating a direction of each of the one or more sound sources on a basis of a change in a frequency of a sound collected by the sound collection portion in association with a change in the positional information of the sound collection portion.

REFERENCE SIGNS LIST 1 information processing system
10 information processing device
101 analysis unit
103 driving control unit
105 process execution unit
107 storage unit
30 sound collection unit
301 sound collection portion
303 support portion
305 driving portion

The invention claimed is:

1. An information processing device, comprising:
an acquisition unit configured to acquire a sound collection result of a sound from each of at least one sound source, wherein
the sound is collected by a sound collection portion, and
positional information of the sound collection portion indicates at least one of a position associated with the sound collection portion or a direction associated with the sound collection portion; and
an estimation unit configured to estimate a direction of each of the at least one sound source based on a change in the positional information of the sound collection portion and a ratio of partial differentiation in a time direction of a spectrum of the sound to partial differentiation in a frequency direction of the spectrum of the sound.

2. The information processing device according to claim 1, wherein the positional information of the sound collection portion is changed in a pattern.

3. The information processing device according to claim 2, further comprising a driving control unit configured to control an operation of a driving portion that changes the positional information of the sound collection portion in the pattern.

4. The information processing device according to claim 3, wherein the driving control unit is further configured to control the operation of the driving portion that changes the positional information of the sound collection portion along a substantially circular path.

5. The information processing device according to claim 1, further comprising a sound control unit configured to control an amplitude of the sound based on an estimation result of the direction of each of the at least one sound source.

6. The information processing device according to claim 1, wherein
the acquisition unit is further configured to acquire a plurality of sound collection results from a plurality of sound collection portions, and
the estimation unit is further configured to estimate the direction of each of the at least one sound source based on a change in a frequency of a respective sound collected by each of the plurality of sound collection portions and movement of each of the plurality of sound collection portions.

7. The information processing device according to claim 1, wherein
the sound collection portion is supported by a moving object,
the positional information is changed relative to the moving object in a specific pattern, and
the estimation unit is further configured to estimate the direction of each of the at least one sound source based on a change in a frequency of the sound, a change in at least one of a position or a direction of the moving object, and the change in the positional information of the sound collection portion relative to the moving object.

8. The information processing device according to claim 7, wherein the moving object is a vehicle.

9. The information processing device according to claim 1, wherein the positional information of the sound collection portion is changed in a specific pattern based on driving operation of a driver.

10. The information processing device according to claim 9, wherein
the driver is a rotator, and
based on a rotation operation of the rotator, the positional information of the sound collection portion is changed along a substantially circular path.

11. The information processing device according to claim 10, wherein the rotator is a rotary wing of a fan installed on one of a ceiling surface or a wall surface.

12. The information processing device according to claim 1, wherein
the at least one sound source is a moving object that outputs the sound, and
the estimation unit is further configured to estimate a direction of the moving object based on a change in a frequency of the sound.

13. The information processing device according to claim 12, wherein the estimation unit is further configured to correct an acquired estimation result of a position of the moving object based on an estimation result of the direction of the moving object.

14. The information processing device according to claim 1, wherein
the acquisition unit is further configured to acquire an image captured by an imaging unit, and
the estimation unit is further configured to estimate the direction of each of the at least one sound source based on an analysis result of the acquired image and a change in a frequency of the sound.

15. An information processing method, comprising:
acquiring a sound collection result of a sound from each of at least one sound source, wherein
the sound is collected by a sound collection portion, and
positional information of the sound collection portion indicates at least one of a position associated with the sound collection portion or a direction associated with the sound collection portion; and
estimating, by a processor, a direction of each of the at least one sound source based on a change in the positional information of the sound collection portion and a ratio of partial differentiation in a time direction of a spectrum of the sound to partial differentiation in a frequency direction of the spectrum of the sound.

16. A non-transitory computer-readable medium having stored thereon computer-executable instructions which when executed by a processor of a device, cause the processor to execute operations, the operations comprising:
acquiring a sound collection result of a sound from each of at least one sound source, wherein
the sound is collected by a sound collection portion, and
positional information of the sound collection portion indicates at least one of a position associated with the sound collection portion or a direction associated with the sound collection portion; and estimating a direction of each of the at least one sound source based on a change in the positional information of the sound collection portion and a ratio of partial differentiation in a time direction of a spectrum of the sound to partial differentiation in a frequency direction of the spectrum of the sound.

\* \* \* \* \*